United States Patent
Nam

(10) Patent No.: US 10,944,323 B2
(45) Date of Patent: Mar. 9, 2021

(54) POWER CONVERTER FOR DETECTING OSCILLATION OF OUTPUT VOLTAGE

(71) Applicant: Samsung Electronics Co., Ltd., Suwon-si (KR)

(72) Inventor: Hyunseok Nam, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 16/685,253

(22) Filed: Nov. 15, 2019

(65) Prior Publication Data
US 2020/0343815 A1  Oct. 29, 2020

(30) Foreign Application Priority Data
Apr. 25, 2019  (KR) ................ 10-2019-0048602

(51) Int. Cl.
*H02M 3/158* (2006.01)
*H02M 3/157* (2006.01)
*H02M 1/32* (2007.01)

(52) U.S. Cl.
CPC ............ *H02M 3/158* (2013.01); *H02M 1/32* (2013.01); *H02M 3/157* (2013.01)

(58) Field of Classification Search
CPC ............ H02M 1/32; H02M 1/36; H02M 1/38; H02M 3/156; H02M 3/1563; H02M 1/1566; H02M 3/157; H02M 3/158
See application file for complete search history.

(56) References Cited

U.S. PATENT DOCUMENTS

| | | | |
|---|---|---|---|
| 8,022,680 B2 * | 9/2011 | Ryoo | H02M 3/156 323/282 |
| 8,975,887 B2 | 3/2015 | Galbis et al. | |
| 9,091,741 B2 | 7/2015 | Mora Sanchez | |
| 9,590,485 B2 | 3/2017 | Jintsugawa et al. | |
| 9,667,153 B2 | 5/2017 | Hara et al. | |
| 10,103,578 B2 | 10/2018 | Yu et al. | |
| 2014/0320112 A1 | 10/2014 | Nodera et al. | |
| 2015/0295506 A1 | 10/2015 | Inomata et al. | |
| 2016/0087526 A1 * | 3/2016 | Satake | H02M 3/156 323/282 |
| 2016/0182131 A1 | 6/2016 | Mednik et al. | |
| 2018/0062509 A1 * | 3/2018 | Duong | H02M 1/08 |
| 2018/0131275 A1 * | 5/2018 | Guan | H02M 3/156 |
| 2018/0191271 A1 | 7/2018 | Giombanco et al. | |

* cited by examiner

*Primary Examiner* — Matthew V Nguyen
(74) *Attorney, Agent, or Firm* — Harness, Dickey & Pierce, P.L.C.

(57) ABSTRACT

A power converter for detecting oscillation of an output voltage including a switching regulator configured to perform switching so that an inductor is alternatively connected to or isolated from an external power voltage and generate the output voltage by a current that flows through the inductor and an oscillation detector configured to detect oscillation that occurs in the output voltage and output an oscillation detection signal by determining whether the oscillation belongs to an oscillation frequency detection range to be detected by the oscillation detector may be provided.

20 Claims, 18 Drawing Sheets ftr : Transient frequency region
fbw : Regulation frequency region
faw : Over-current protect operation frequency region
fsw : Switching frequency region
fdet : Detection range of oscillation frequency

POWER CONVERTER FOR DETECTING OSCILLATION OF OUTPUT VOLTAGE

CROSS-REFERENCE TO RELATED APPLICATION

This application claims the benefit of Korean Patent Application No. 10-2019-0048602, filed on Apr. 25, 2019, in the Korean Intellectual Property Office, the disclosure of which is incorporated herein in its entirety by reference.

BACKGROUND

The inventive concepts relate to power converters, and more particularly, to methods and/or apparatuses for detecting oscillation that occurs due to an output voltage of a power converter.

Recently, with rapid increase in use of mobile devices such as a smart phone and a tablet PC, which need efficient power management, a high-performance power management integrated circuit chip (PMIC) is desired. With the increase in sizes of display panels mounted in electronic devices, display panels are desired to have high picture quality. Therefore, display PMICs having relatively low power consumption and relatively high efficiency are desired. Because display panels are driven at relatively high voltages and power with relatively high efficiency, switching regulators such as pulse width modulation (PWM) direct current (DC)-DC converters are used.

A switching regulator generates a PWM signal by using, for example, a ramp signal, and generate a desired output voltage by stepping up or stepping down an input voltage based on the PWM signal. In switching regulator applications, a power converter is referred to as a boost converter when an output voltage is higher than the input voltage, and is referred to as a buck converter when the output voltage is lower than the input voltage.

A switching regulator capable of stably providing an output voltage is desired. However, the switching regulator may become unstable due to deterioration of a semiconductor device together with a change in an external environment such as temperature. Due to such instability, the output voltage of the switching regulator may oscillate (or may not be uniform), thereby deteriorating characteristics of an entire electronic device or system including the switching regulator.

SUMMARY

The inventive concepts provide power converters for detecting oscillation of an output voltage and outputting an oscillation detection signal, oscillation detectors included in the power converter, and/or methods of operating the power converter.

According to an aspect of the inventive concepts, there is provided a power converter for receiving an external power voltage and generating an output voltage with a target level, including a switching regulator configured to perform switching so that an inductor is alternatively connected to or isolated from the external power voltage and to generate the output voltage by a current that flows through the inductor and an oscillation detector configured to detect oscillation that occurs in the output voltage and to output an oscillation detection signal by determining whether the oscillation belongs to an oscillation frequency detection range to be detected by the oscillation.

According to an aspect of the inventive concepts, there is provided an oscillation detector for detecting oscillation of a source voltage, including a frequency measuring unit configured to generate an oscillation signal by inputting the source voltage, amplifying the source voltage, and comparing a level of the amplified source voltage with levels of first and second reference voltages, a frequency detector configured to generate a sensing voltage based on the oscillation signal and a clock signal and to generate a detection signal by comparing the sensing voltage with first and second threshold voltages, and a duty cycle detector configured to generate a duty cycle signal based on the oscillation signal and the detection signal and to generate an oscillation detection signal by comparing a voltage level of the duty cycle signal with levels of first and second limit voltages.

According to an aspect of the inventive concepts, there is provided a method of detecting oscillation that occurs in an output voltage of a power converter, including generating an oscillation signal by inputting the output voltage, amplifying the output voltage, and comparing a level of an amplified output voltage with levels of first and second reference voltages, generating a sensing voltage based on the oscillation signal and a clock signal and generating a detection signal by comparing the sensing voltage with first and second threshold voltages, generating a duty cycle signal based on the oscillation signal and the detection signal and generating an oscillation detection signal by comparing a voltage level of the duty cycle signal with levels of first and second limit voltages, and outputting the oscillation detection signal to an outside of the power converter.

According to an example embodiment of the inventive concepts, a power converter for detecting oscillation of an output voltage may include a switching regulator configured to perform switching so that an inductor is alternatively connected to or isolated from an external power voltage and generate the output voltage by a current that flows through the inductor and an oscillation detector configured to detect oscillation that occurs in the output voltage and output an oscillation detection signal by determining whether the oscillation belongs to an oscillation frequency detection range to be detected by the oscillation detector.

According to an example embodiment of the inventive concepts, an oscillation detector for detecting oscillation of an output voltage, the oscillation detector may include a frequency measuring circuit configured to receive the output voltage as a source voltage, amplify the source voltage, and generate an oscillation signal based on a level of the amplified source voltage and levels of first and second reference voltages, a frequency detector configured to generate a sensing voltage based on the oscillation signal and a clock signal and generate a detection signal based on the sensing voltage and first and second threshold voltages, and a duty cycle detector configured to generate a duty cycle signal based on the oscillation signal and the detection signal and generate an oscillation detection signal based on a voltage level of the duty cycle signal, a first level of a first limit voltage, and a second level of a second limit voltage.

According to an example embodiment of the inventive concepts, a method of detecting oscillation that occurs in an output voltage of a power converter may include receiving the output voltage as a source voltage, amplifying the source voltage, generating an oscillation signal based on a level of an amplified output voltage and a first level of a first reference voltage and a second level of a second reference voltage, generating a sensing voltage based on the oscillation signal and a clock signal, generating a detection signal based on the sensing voltage, a first threshold voltage, and a second threshold voltage, generating a duty cycle signal based on the oscillation signal and the detection signal, generating an oscillation detection signal based on a voltage level of the duty cycle signal, a third level of a first limit voltage, and a fourth level of a second limit voltage, and outputting the oscillation detection signal to an outside of the power converter.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

While the term "same" or "identical" is used in description of example embodiments, it should be understood that some imprecisions may exist. Thus, when one element is referred to as being the same as another element, it should be understood that an element or a value is the same as another element within a desired manufacturing or operational tolerance range (e.g., ±10%).

When the terms "about," "substantially," or "approximately" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure.

Figure 1:
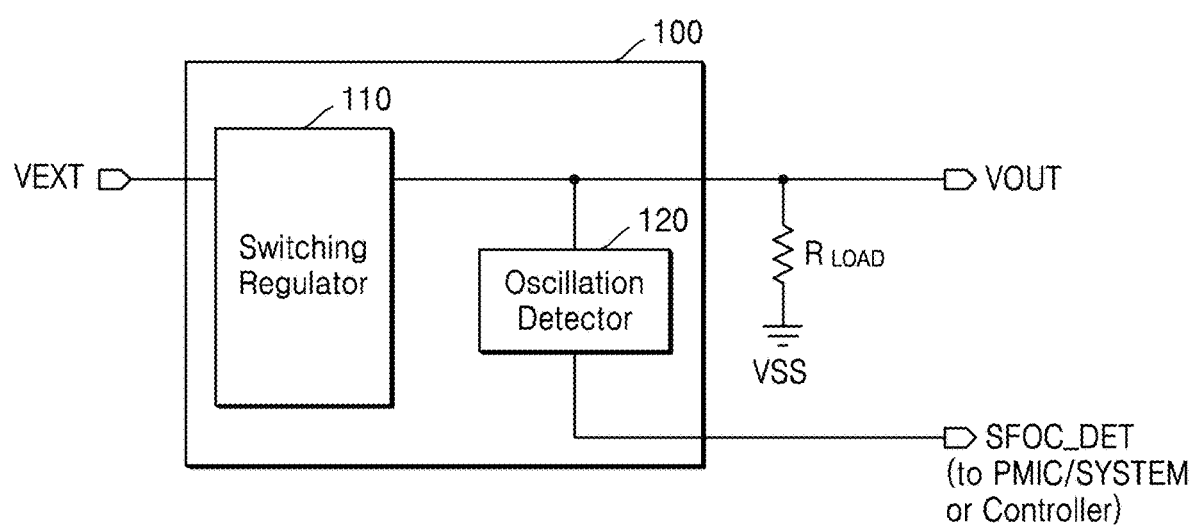
FIG. 1 is a view conceptually illustrating a power converter according to an example embodiment of the inventive concepts.

FIG. 1 is a view conceptually illustrating a power converter 100 according to an example embodiment of the inventive concepts.

Referring to FIG. 1, the power converter 100 may be configured to receive an external power voltage VEXT and generate an output voltage VOUT with a target level. The power converter 100 may include a step down switching regulator (not shown) used for decreasing the external power voltage VEXT and distributing a direct current (DC) voltage to electronic devices (or load points R$_{LOAD}$). The external power voltage VEXT may be a battery voltage used as power of the power converter 100. The power converter 100 is described in an example context of a pulse width modulation (PWM) step down converter. One or more characteristics of the contents of the current disclosure may be utilized for other types of PWM applications, for example, a boost regulator (or converter) and a buck-boost regulator (or converter).

The power converter 100 may include a switching regulator 110 and an oscillation detector 120. The switching regulator 110 may receive the external power voltage VEXT, and provide the output voltage VOUT with a lower level than that of the external power voltage VEXT to a load R$_{LOAD}$. The oscillation detector 120 may output an oscillation detection signal SFOC_DET by monitoring the output voltage VOUT and detecting oscillation of the output voltage VOUT. The output voltage VOUT of the switching regulator 110 may be used as a source voltage of the oscillation to be detected by the oscillation detector 120.

An oscillation detection signal SFOC_DET may be output to the outside of the power converter 100. The oscillation detection signal SFOC_DET may be output to a device or a system such as a power management integrated circuit chip (PMIC) including the power converter 100. In some example embodiments, the oscillation detection signal SFOC_DET may be output to a controller (not shown) in the power converter 100. The controller, the device, or the system may perform a stable operation in response to the oscillation detection signal SFOC_DET. Such a performance may be implemented by hardware or software. For example, the controller, the device, or the system may control the switching regulator 110 such that an operation of the switching regulator 110 is disabled until the oscillation that occurs in the output voltage VOUT disappears in response to the oscillation detection signal SFOC_DET.

Figure 2:
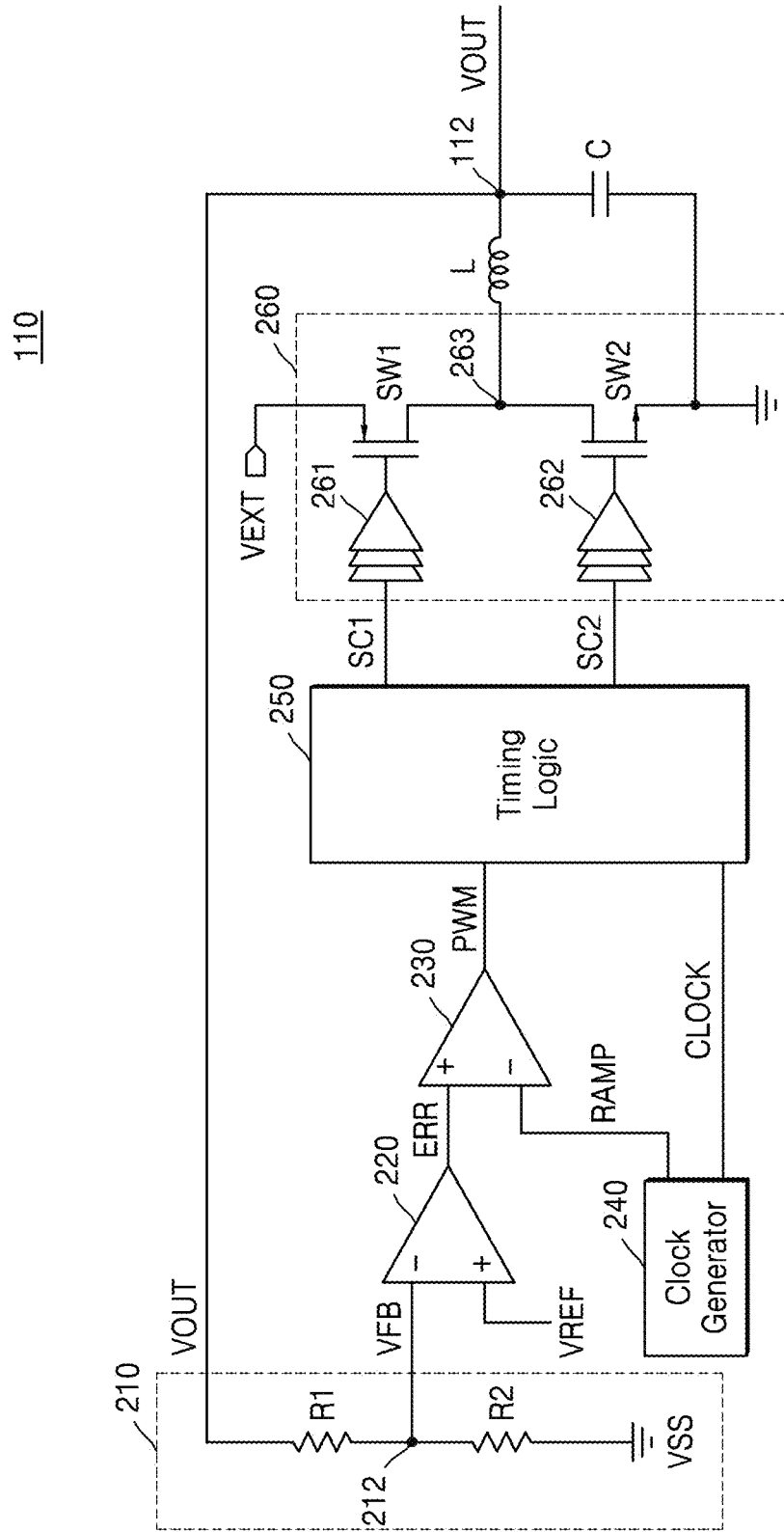
FIG. 2 is a block diagram illustrating the switching regulator of FIG. 1.

FIG. 2 is a block diagram illustrating the switching regulator 110 of FIG. 1.

Referring to FIG. 2, the switching regulator 110 may include a voltage distributor 210, an error amplifier 220, a comparator 230, a clock generator 240, a timing logic 250, a switch block 260, an inductor L, and an output capacitor C. As understood hereinafter, in order to alternately connect or disconnect the inductor L to or from the external power voltage VEXT, the switching regulator 110 may be configured such that a duty cycle in which switches SW1 and SW2 of the switch block 260 are turned on changes, and may be configured such that the output voltage VOUT lower than the external power voltage VEXT is output as the inductor L stores or drains energy.

The voltage distributor 210 may include a first resistor R1 and a second resistor R2 that are connected between an output node 212 and a node of a ground voltage VSS, and may output a feedback voltage VFB. Resistance values of the first and second resistors R1 and R2 may be equal or may not be equal to each other. The feedback voltage VFB may be output from the node 212 connected to the first and second resistors R1 and R2, and may be transmitted to an inverting input terminal (−) of the error amplifier 220. The voltage distributor 210 may provide the proportionally low feedback voltage VFB by dividing the output voltage VOUT.

The error amplifier 220 may output an error signal ERR by amplifying a voltage difference between the feedback voltage VFB and a reference voltage VREF. The reference voltage VREF may be generated to have a particular level in the power converter 100 and may be provided to a non-inverting input terminal (+) of the error amplifier 220. For example, when the feedback voltage VFB is higher than the reference voltage VREF, a voltage level of the error signal ERR may decrease in accordance with the voltage difference. When the feedback voltage VFB is lower than the reference voltage VREF, the voltage level of the error signal ERR may increase in accordance with the voltage difference.

The comparator 230 may receive the error signal ERR at the non-inverting input terminal (+) thereof, and generate a PWM signal at the inverting input terminal (−) thereof by comparing a ramp signal RAMP with the error signal ERR. The ramp signal RAMP may be provided by the clock generator 240 as, for example, a triangular wave ramp signal. When the error signal ERR is greater than the ramp signal RAMP, the comparator 230 may generate the PWM signal in a logic high state. When the error signal ERR is less than the ramp signal RAMP, the PWM signal may be in a logic low state.

The clock generator 240 may generate and provide the ramp signal RAMP and a clock signal CLOCK to the timing logic 250. According to an example embodiment, the clock generator 240 may randomly change a period (or a frequency) of the clock signal CLOCK.

The timing logic 250 may receive the PWM signal and the clock signal CLOCK, and provide series and shunt control signals SC1 and SC2 so that a series switch SW1 and a shunt switch SW2 of the switch block 260 mutually exclusively operate. That is, the timing logic 250 may turn off the shunt switch SW2 when the series switch SW1 is turned on and may turn on the shunt switch SW2 when the series switch SW1 is turned off. The timing logic 250 may control timings of the series switch SW1 and the shunt SW2 by using the series and shunt control signals SC1 and SC2.

The switch block 260 may include driver amplifiers 261 and 262, and the series and shunt switches SW1 and SW2 serially connected between a node of the external power voltage VEXT and the node of the ground voltage VSS. The inductor L is connected between a switch node 263 to which the series switch SW1 and the shunt switch SW2 are connected and the output node 112, and the output capacitor C may be connected between the output node 112 and the node of the ground voltage VSS.

The series and shunt switches SW1 and SW2 may be implemented by relatively large switching transistors. The series and shunt control signals SC1 and SC2 provided by the timing logic 250 may be amplified before being used for controlling the series and shunt switches SW1 and SW2. The driver amplifiers 261 and 262 may include cascades of inverters, and may be designed such that each of the inverters is greater than an inverter in a previous stage and an inverter in the last stage is large sufficient to drive the switching transistors (e.g., the series and shunt switches SW1 and SW2) for about several millimeters.

In each switching cycle of a PMW operation, in a period in which the series switch SW1 is turned on and the shunt switch SW2 is turned off, power transmission may occur from the external power voltage VEXT to the switch node 263, and a current flowing through the inductor L may increase. In a period in which the series switch SW1 is turned off and the shunt switch SW2 is turned on, the current flowing through the inductor L may decrease. Through such operations, energy built up in the inductor L may be charged in the output capacitor C, and the output voltage VOUT may be generated.

Figure 3:
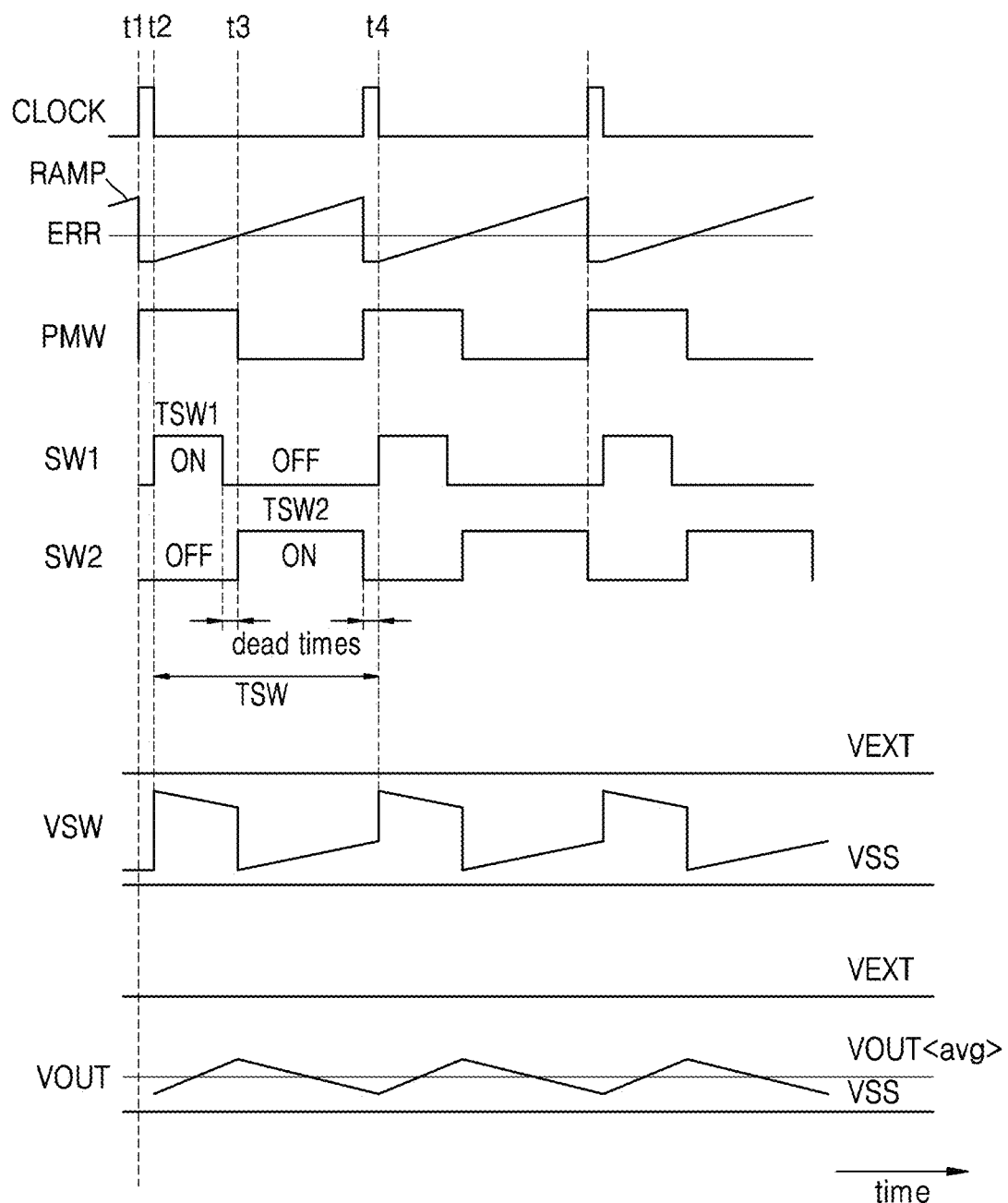
FIG. 3 is a timing diagram illustrating an operation of the switching regulator of FIG. 2.

FIG. 3 is a timing diagram illustrating an operation of the switching regulator 110 of FIG. 2.

Referring to FIG. 3, at a point in time t1, the clock signal CLOCK may transition to a high pulse and the ramp signal RAMP may drop to a lower level than that of the error signal ERR. While the ramp signal RAMP is dropped, the level of the ramp signal RAMP crosses the level of the error signal ERR and the PWM signal output from the comparator 230 may transition to a logic high state.

At a point in time t2, the clock signal CLOCK may transition from high to low and the ramp signal RAMP may start ramping up. Approximately at the point in time t2, the series switch SW1 may be turned on and the power transmission may occur from the external power voltage VEXT to the switch node 263. Accordingly, a voltage VSW of the switch node 263 may transition to high.

At a point in time t3, when the level of the ramp signal RAMP crosses the level of the error signal ERR, the PWM signal may transition from high to low. Approximately from the point in time t3 to a point in time t4, the shunt switch SW2 may be turned on, and the current of the inductor L may decreases. Accordingly, the voltage VSW of the switch node 263 may transition to low.

As illustrated, a dead time may be interposed between a period TSW1 in which the series switch SW1 is turned on and a period TSW2 in which the shunt switch SW2 is turned on, in order to block or prevent the series and shunt switches SW1 and SW2, from being simultaneously turned on. The dead time may reduce or prevent excessive power consumption from occurring due to a current that directly flows from the external power voltage VEXT and the ground voltage VSS, and to mitigate or prevent reliability from deteriorating due to the excessive power consumption.

In accordance with the switching cycle TSW of the PMW operation, the voltage VSW of the switch node 263, which alternately increases and decreases in accordance with turn on and turn off states of the series switch SW1 and the shunt switch SW2, may be smoothed by the inductor L and the output capacitor C, and accordingly, the output voltage VOUT with the target level may be output. An average voltage VOUT<avg> of the output voltage VOUT may have a lower level than that of the external power voltage VEXT, and output with the target level of the output voltage VOUT.

FIGS. 4A to 4D are views illustrating waveforms of the output voltage VOUT of the switching regulator 110 of FIG. 2.

Figure 4A:
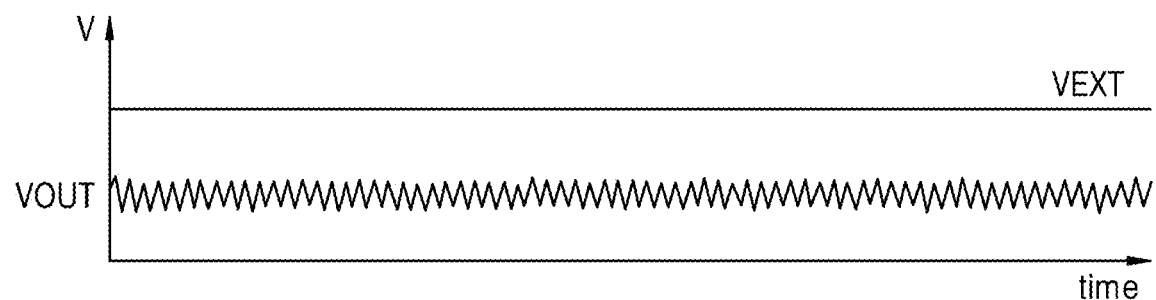
FIGS. 4A to 4D are views illustrating waveforms of the output voltage of the switching regulator of FIG. 2.

Referring to FIG. 4A, in accordance with a switching operation of the switching regulator 110, the output voltage VOUT may oscillate at a uniform frequency with a desired (or alternatively, predetermined) peak-to-peak voltage lower than the external power voltage VEXT. For example, the output voltage VOUT may oscillate at a switching frequency of about 3 MHz.

Figure 4B:
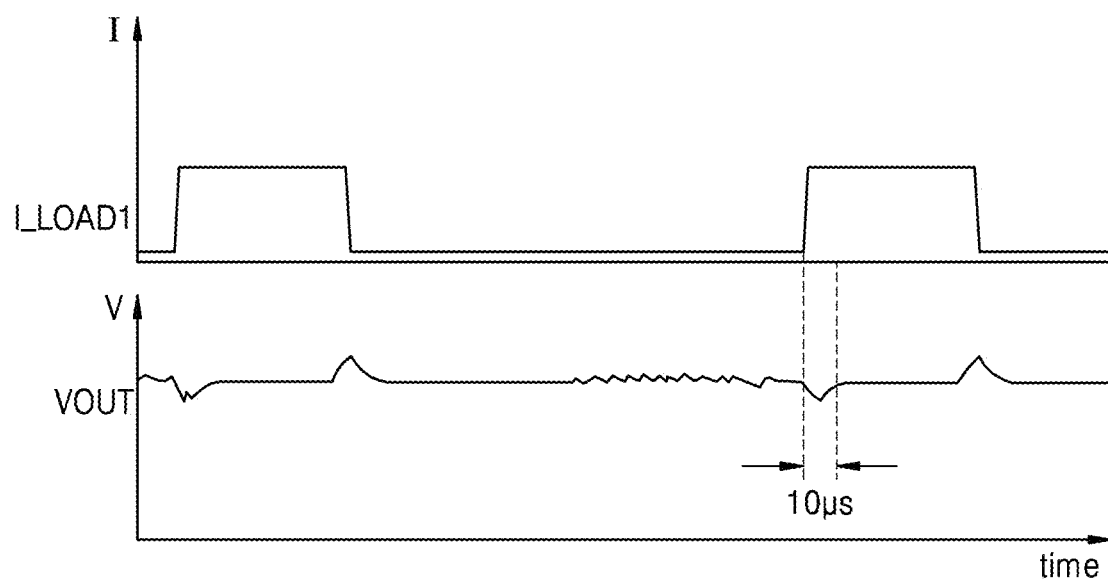
Figure 4C:
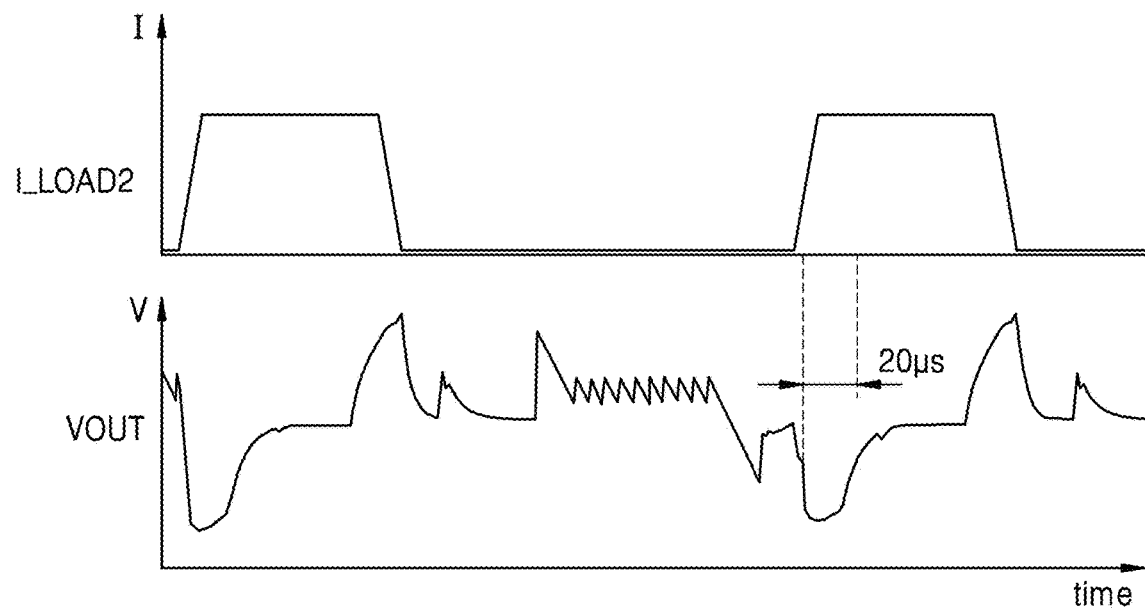

FIGS. 4B and 4C illustrate waveforms of the output voltage VOUT in accordance with a change in load R$_{LOAD}$ (FIG. 1) connected to the output voltage VOUT of the switching regulator 110. In FIG. 4B, it is illustrated that the output voltage VOUT has a transient time of about 10 μs with respect to a pulse of a first load current I_LOAD1 that flows through the load R$_{LOAD}$. When the pulse of the first load current I_LOAD1 is frequently switched, the output voltage VOUT has a switching cycle of about 20 μs in accordance with undershoot and overshoot, and oscillates at a transient frequency of about 50 kHz. In FIG. 4C, it is illustrated that the output voltage VOUT has a transient time of about 20 μs with respect to a pulse of a second load current I_LOAD2 higher than the first load current I_LOAD1. When the pulse of the second load current I_LOAD2 is frequently switched, the output voltage VOUT has a switching cycle of about 40 μs in accordance with undershoot and overshoot and oscillates at a transient frequency of about 25 kHz. It is illustrated that the transient frequencies of the output voltage VOUT of FIGS. 4B and 4C are lower than the frequency of FIG. 4A.

The switching regulator 110 may be desired to provide over-current protection capabilities (e.g., to block or prevent the regulated output node 112 from being shorted to ground GND). When the output voltage VOUT is low or is under a ground fault condition, a problem referred to as current limit runaway may occur. The current limit runaway occurs when the shunt switch SW2 is turned on, but it is not sufficient to drain all the energy of the inductor L built up when the series switch SW1 is turned on. When such a condition exists, increase in a plurality of continuous cycles in the current of the inductor L may cause the current limit runaway. The switching regulator 110 may be configured such that a current that flows through the inductor L decreases to about 0 by turning off the series switch SW1 and turning on the shunt switch SW2 to drain the energy stored in the inductor L in an over-current protection mode.

For example, when a value of the current that flows through the inductor L exceeds a current limit value, the switching regulator 110 may enter the over-current protection mode in which the series switch SW1 is turned off and the shunt switch SW2 is turned on. Thus, the energy stored in the inductor L is drained, and the current that flows through the inductor L may cross 0. At this point, the switching regulator 110 may resume controlling standards of the series switch SW1 and the shunt switch SW2. Thus, the current that flows through the inductor L may rapidly increase until the value thereof reaches the current limit value. At this time, when the feedback voltage VFB distributed by the output voltage VOUT is higher than a reference voltage VREF, the over-current protection mode is maintained. The current that flows through the inductor L may start decreasing again after the value thereof reaches the current limit value. In such cycles, the current that flows through the inductor L may oscillate between the current limit value and 0. When the feedback voltage VFB decreases to be lower than the reference voltage VREF, the switching regulator 110 may exit the over-current protection mode.

Figure 4D:
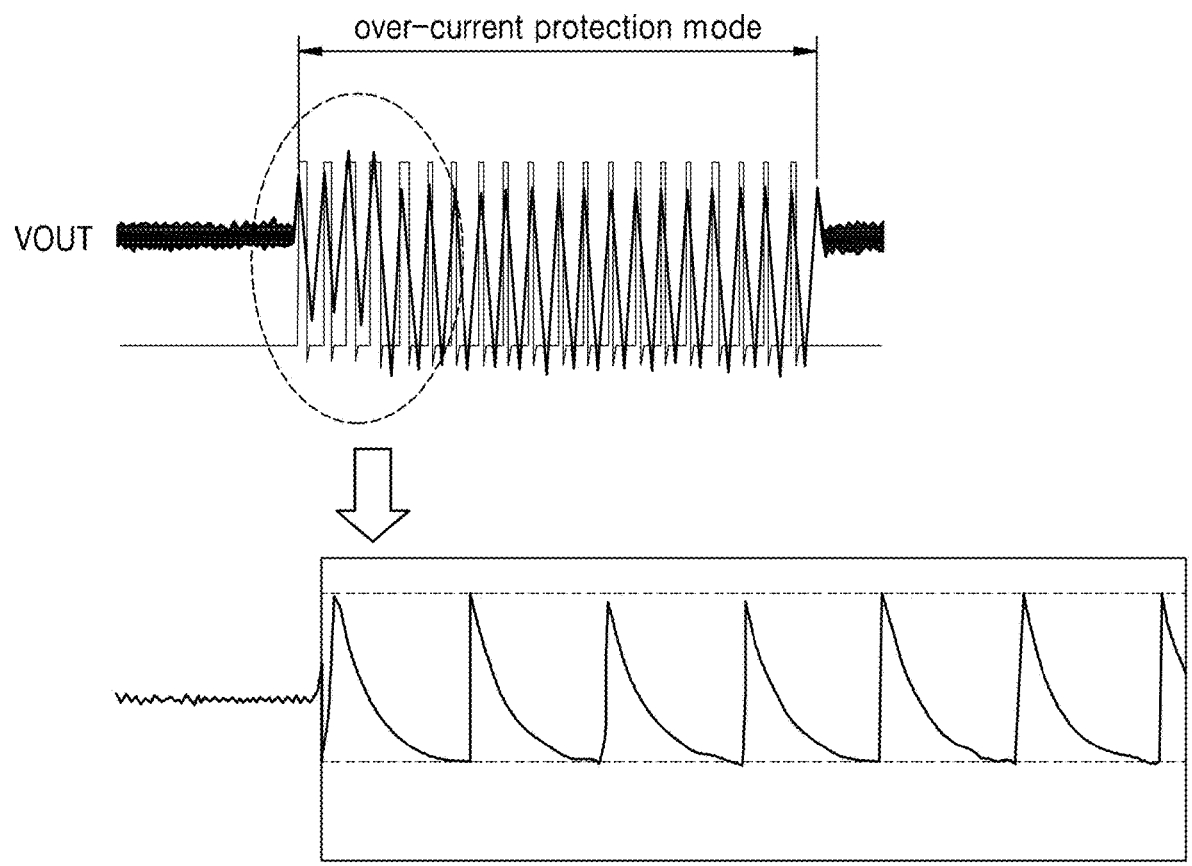

In FIG. 4D, it is illustrated that the output voltage VOUT oscillates in accordance with the current of the inductor L that oscillates between the current limit value and 0 in the over-current protection mode of the switching regulator 110. At this time, it is illustrated that the output voltage VOUT has a non-uniform duty.

Figure 5:
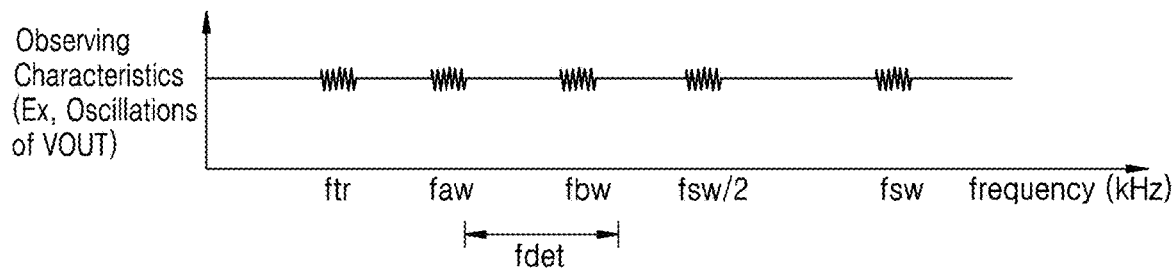
FIG. 5 is a view schematically illustrating a frequency characteristic profile observed in the output voltage when the switching regulator of FIG. 2 operates.

FIG. 5 is a view schematically illustrating a frequency characteristic profile observed in the output voltage VOUT when the switching regulator 110 of FIG. 2 operates.

Referring to FIG. 5, in relation to the operation of the switching regulator 110, the output voltage VOUT oscillates in a transient frequency range ftr, an over-current protect operation frequency range faw, an operation bandwidth fbw, and a switching frequency range fsw. The transient frequency range ftr as an oscillation frequency range of the output voltage VOUT in accordance with the load current I_LOAD, which is illustrated in FIGS. 4B and 4C, is marked as the lowest operation frequency range among oscillation frequency ranges. The switching frequency range fsw as the oscillation frequency range of the output voltage VOUT in accordance with the switching operation of the switching regulator 110, which is illustrated in FIG. 4A, is marked as the highest operation frequency range among the oscillation frequency ranges. The operation bandwidth fbw as a frequency band in which the output voltage VOUT regulated to have the target level is output is marked as a frequency range lower than a frequency range fsw/2 corresponding to a half of the switching frequency range fsw. The over-current protect operation frequency range faw as a frequency band in which the output voltage VOUT oscillates as the current of the inductor L of the switching regulator 110 oscillates between the current limit value and zero in the over-current protection mode, which is illustrated in FIG. 4D, is between the transient frequency range ftr and the operation bandwidth fbw.

An oscillation frequency detection range fdet of the output voltage VOUT to be detected by the oscillation detector 120 may be a frequency range including a portion of the operation bandwidth fbw and a portion of the over-current protect operation frequency range faw. According to an example embodiment, the oscillation frequency detection range fdet of the output voltage VOUT may vary in accordance with different frequency ranges. Some example methods of detecting whether the oscillation of the output voltage VOUT belongs to the oscillation frequency detection range fdet are described in detail hereinafter.

Figure 6:
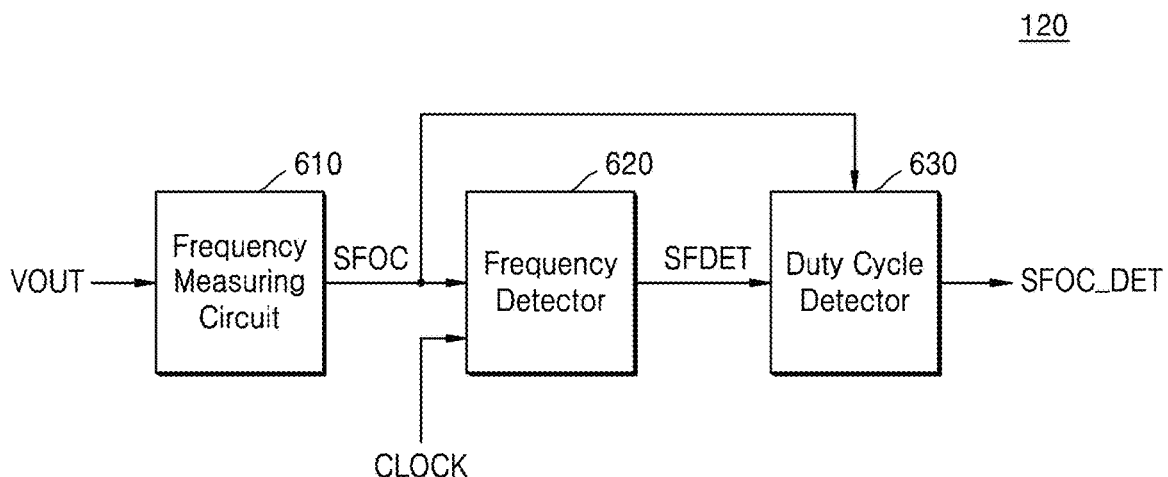
FIG. 6 is a block diagram illustrating an oscillation detector of FIG. 1.

FIG. 6 is a block diagram illustrating the oscillation detector 120 of FIG. 1.

Referring to FIG. 6, the oscillation detector 120 may receive the output voltage VOUT output from the switching regulator 110 and detect the oscillation of the output voltage VOUT. The oscillation detector 120 may be configured to determine whether the oscillation of the output voltage VOUT belongs to the oscillation frequency detection range to be detected and output the oscillation detection signal. The oscillation detector 120 may include a frequency measuring circuit 610, a frequency detector 620, and a duty cycle detector 630.

The frequency measuring circuit 610 may be configured to receive the output voltage VOUT, amplify the output voltage VOUT, generate an oscillation signal SFOC based on the amplified output voltage and first and second reference voltages. For example, the frequency measuring circuit 610 may be configured to generate the oscillation signal SFOC by receiving the output voltage VOUT, amplifying the output voltage VOUT, and comparing a level of the amplified output voltage with levels of first and second reference voltages. Some example embodiments of the frequency measuring circuit 610 will be described in detail with reference to FIGS. 7A, 7B, and 8.

The frequency detector 620 may be configured to generate a sensing voltage (not shown) based on the oscillation signal SFOC and the clock signal CLOCK and generate a detection signal SFDET based on the sensing voltage and first and second threshold voltages (e.g., by comparing the sensing voltage with first and second threshold voltages). Some example embodiments of the frequency detector 620 will be described in detail with reference to FIGS. 9, 10, and 11.

The duty cycle detector 630 may be configured to generate a duty cycle signal (not shown) based on the oscillation signal SFOC and the detection signal SFDET, and generate the oscillation detection signal SFOC_DET based on a voltage level of the duty cycle signal and first and second limit voltages. For example, the duty cycle detector 630 may be configured to generate a duty cycle signal (not shown) based on the oscillation signal SFOC and the detection signal SFDET, and generate the oscillation detection signal SFOC_DET by comparing a voltage level of the duty cycle signal with first and second limit voltages. Some example embodiments of the duty cycle detector 630 will be described in detail with reference to FIGS. 12A to 12C, 13, and 14.

Figure 7A:
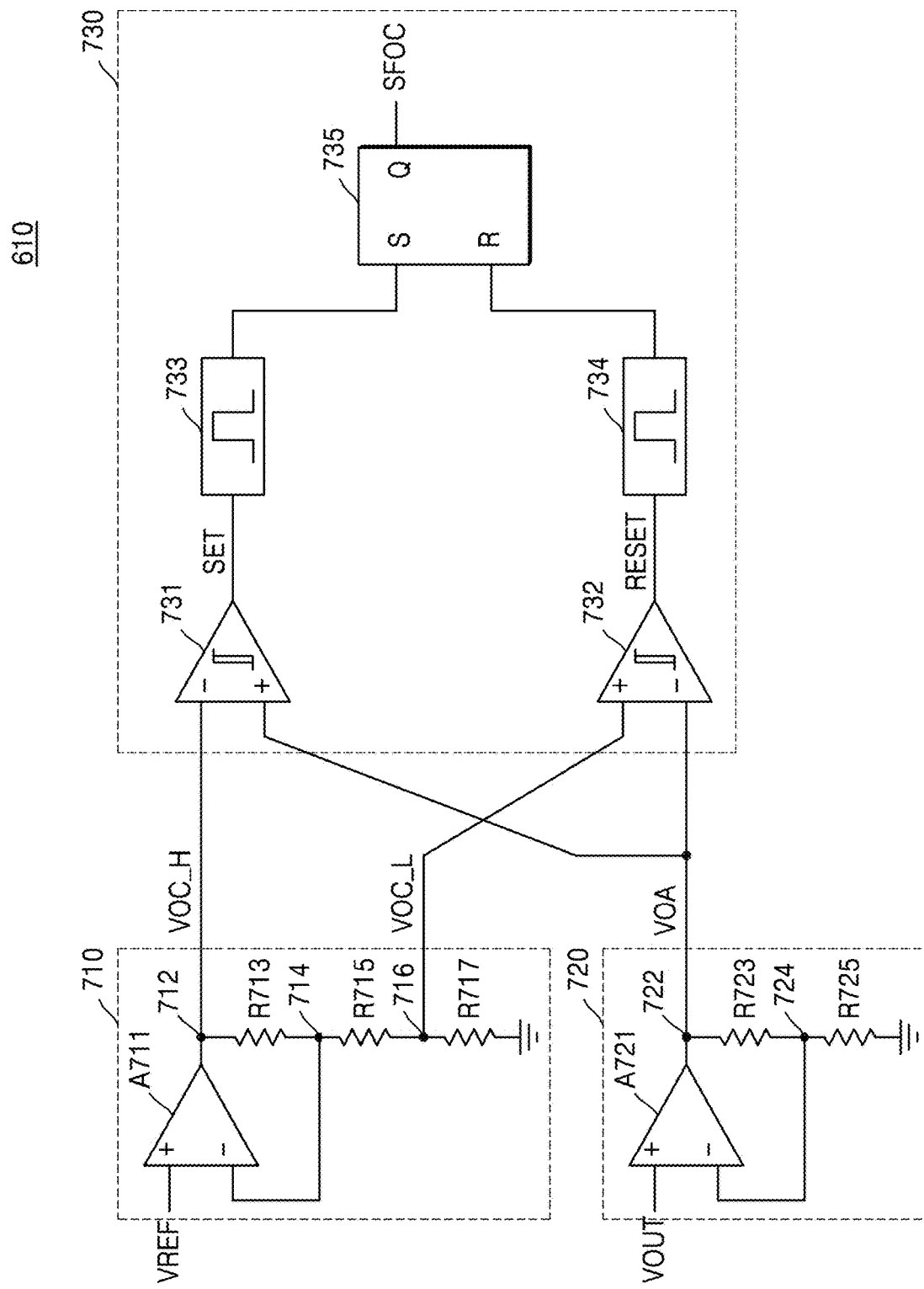
FIGS. 7A and 7B are example circuits of the frequency measuring circuit of FIG. 6.
Figure 7B:
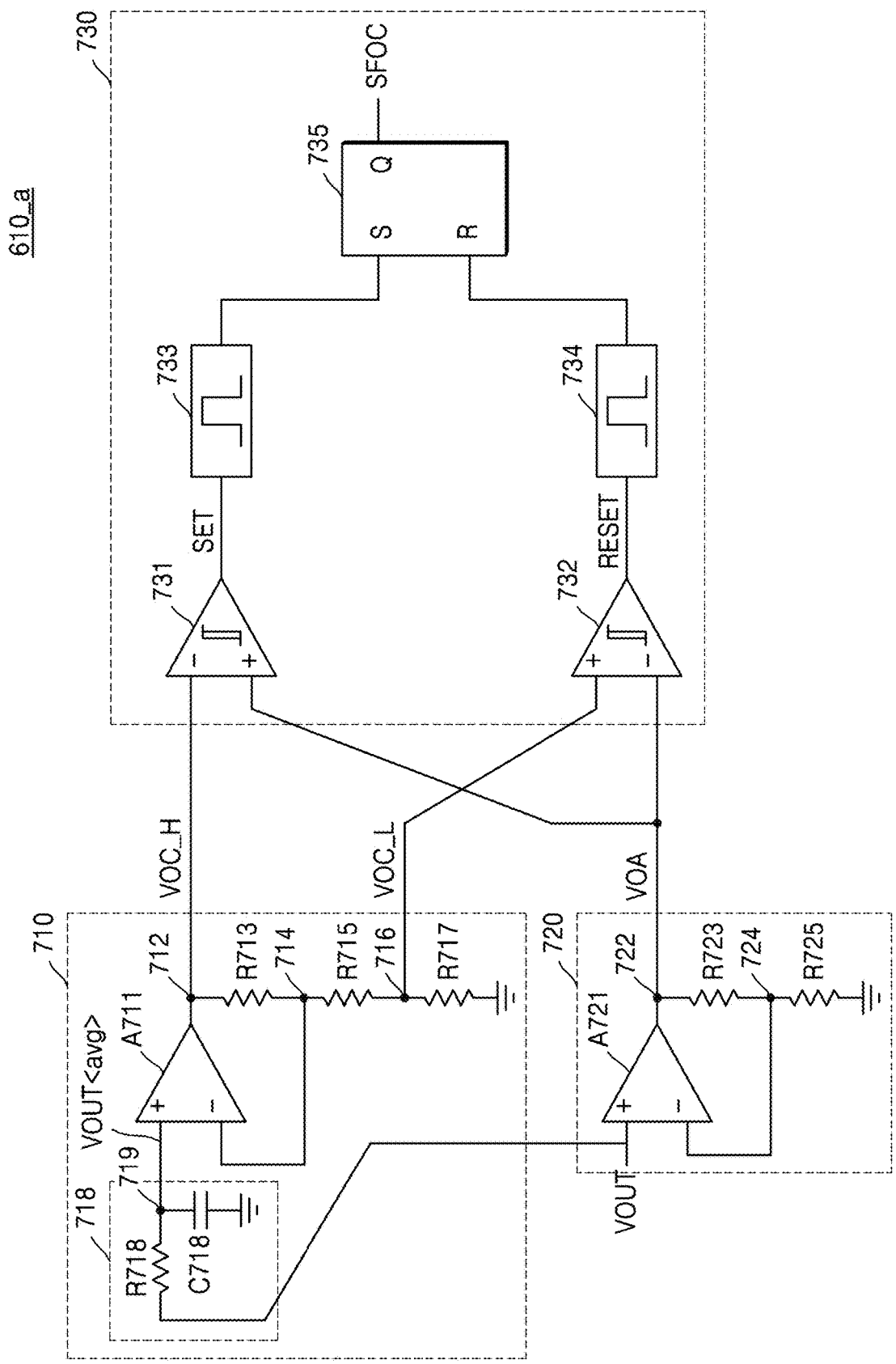

FIGS. 7A and 7B are example circuits of the frequency measuring circuit 610 of FIG. 6. FIG. 7A illustrates the frequency measuring circuit 610 configured to detect the oscillation of the output voltage VOUT by using the reference voltage VREF. FIG. 7B illustrates a frequency measuring circuit 610_a configured to detect the oscillation of the output voltage VOUT by using the average voltage VOUT<avg> of the output voltage VOUT. The frequency measuring circuit 610_a of FIG. 7B may be configured to adaptively detect the oscillation of the output voltage VOUT in accordance with a change in the output voltage VOUT.

Referring to FIG. 7A, the frequency measuring circuit 610 may include a reference voltage generator 710, an amplifier 720, and an oscillation signal generator 730.

The reference voltage generator 710 may receive the reference voltage VREF and generate first and second reference voltages VOC_H and VOC_L. The reference voltage generator 710 may include a first amplifier A711 and a plurality of resistors R713, R715, and R717. The reference voltage VREF may be provided to a non-inverting input terminal (+) of the first amplifier A711. The resistors R713, R715, and R717 may be serially connected between an output node 712 of the first amplifier A711 and the ground voltage VSS. The resistor R713 and the resistor R715 may be commonly connected through a node 714, and the node 714 may be connected to an inverting input terminal (−) of the first amplifier A711. The first amplifier A711 may amplify a difference between the reference voltage VREF and a voltage of the node 714, and provide the first reference voltage VOC_H to the output node 712. A voltage of a node 716 to which the resistor R715 and the resistor R717 are commonly connected may provide the second reference voltage VOC_L. The second reference voltage VOC_L is lower than the first reference voltage VOC_H. The frequency measuring circuit 610, which is included in the oscillation detector 120 of FIG. 6, may be configured to detect an oscillation amplitude of the output voltage VOUT based on the first and second reference voltages VOC_H and VOC_L.

The amplifier 720 may include resistors R723 and R725 serially connected between an output node 722 of the second amplifier A721 and the ground voltage VSS. The second amplifier A721 may receive the output voltage VOUT of the switching regulator 110 at a non-inverting input terminal (+) and may receive a voltage of a node 724 to which the resistor R723 and the resistor R725 are commonly connected at an inverting input terminal (−). The second amplifier A721 may amplify an alternating current (AC) component of the output voltage VOUT by a resistance ratio between the resistor R723 and the resistor R725 and provide an amplified output voltage VOA to the output node 722. Because not only the AC component but also a DC component is included in the output voltage VOUT, the second amplifier A721 may be implemented by a wide bandwidth operational (OP) amplifier.

The oscillation signal generator 730 may amplify the output voltage and generate the oscillation signal SFOC based on the amplified output voltage VOA, the first reference voltage VOC_H, and the second reference voltage VOC_L. For example, the oscillation signal generator 730 may compare the amplified output voltage VOA with the first and second reference voltages VOC_H and VOC_L, and generate the oscillation signal SFOC as a comparison result. The oscillation signal generator 730 may include first and second comparators 731 and 732, first and second pulse generators 733 and 734, and a flip-flop 735.

The first comparator 731 may receive the first reference voltage VOC_H at an inverting input terminal (−) and may receive the amplified output voltage VOA at a non-inverting input terminal (+). The first comparator 731 may compare a level of the amplified output voltage VOA with a level of the first reference voltage VOC_H, and output a set signal SET. When the amplified output voltage VOA is higher than the first reference voltage VOC_H, the first comparator 731 may output the set signal SET with a logic high level. When the amplified output voltage VOA is lower than the first reference voltage VOC_H, the set signal SET with a logic low level may be output. The set signal SET may be provided to a set input terminal S of the flip-flop 735 through a first pulse generator 733.

The second comparator 732 may receive the amplified output voltage VOA at an inverting input terminal (−) and receive the second reference voltage VOC_L at a non-inverting input terminal (+). The second comparator 732 may compare the level of the amplified output voltage VOA with a level of the second reference voltage VOC_L, and output a reset signal RESET. When the amplified output voltage VOA is higher than the second reference voltage VOC_L, the second comparator 732 may output the reset signal RESET with a logic low level. When the amplified output voltage VOA is lower than the second reference voltage VOC_L, the reset signal RESET with a logic high level may be output. The reset signal RESET may be provided to a reset input terminal R of the flip-flop 735 through the second pulse generator 734.

The first and second comparators 731 and 732 may be configured to use time or voltage hysteresis in a comparison operation. For example, rather than immediately outputting the set signal SET with the logic high level as soon as the amplified output voltage VOA is higher than or the same as the first reference voltage VOC_H, the first comparator 731 may output the set signal SET with the logic high level when the amplified output voltage VOA is higher than or the same as the first reference voltage VOC_H for a desired (or alternatively, predetermined) amount of time. Rather than immediately outputting the reset signal RESET with the logic high level as soon as the amplified output voltage VOA is lower than or the same as the second reference voltage VOC_L, the second comparator 732 may output the reset signal RESET with the logic high level when the amplified output voltage VOA is lower than or the same as the second reference voltage VOC_L for a desired (or alternatively, predetermined) amount of time.

The flip-flop 735 may output the oscillation signal SFOC in response to the set signal SET and the reset signal RESET that are input to set and reset input terminals S and R. The oscillation signal SFOC may have low-high transition in synchronization with low-high transition of the set signal SET input to the set input terminal S and may have high-low transition in synchronization with low-high transition of the reset signal RESET input to the reset input terminal R. That is, the oscillation signal SFOC may be output as a repeated pulse having a desired (or alternatively, predetermined) frequency and duty cycle (or on-time or a high level period) by a combination of the set signal SET and the reset signal RESET.

Referring to FIG. 7B, in comparison with the frequency measuring circuit 610 of FIG. 7A, the frequency measuring circuit 610_a further includes a low pass filter 718 in a reference voltage generator 710 and an output node 719 of the low pass filter 718 is connected to the non-inverting input terminal (+) of the first amplifier A711.

The low pass filter 718 may include a resistor R718 connected between the output node 112 (FIG. 2) of the output voltage VOUT of the switching regulator 110 and the node 719 and a capacitor C718 connected between the node 719 and the node of the ground voltage VSS. The low pass filter 718 may provide a level corresponding to the average voltage VOUT<avg> of the output voltage VOUT to the non-inverting input terminal (+) of the first amplifier A711 of the reference voltage generator 710. The first amplifier A711 may generate the first and second reference voltages VOC_H and VOC_L based on the level of the average voltage VOUT<avg> of the output voltage VOUT. That is, the reference voltage generator 710 may generate the first and second reference voltages VOC_H and VOC_L that adaptively vary in accordance with the change in the output voltage VOUT.

The frequency measuring circuit 610_a may compare the amplified output voltage VOA with the first and second reference voltages VOC_H and VOC_L that vary in accordance with the output voltage VOUT, and output the oscillation signal SFOC as the repeated pulse. The frequency measuring circuit 610_a may detect the oscillation of the output voltage VOUT adaptively in response to the change in the output voltage VOUT FIG. 8 is a timing diagram illustrating operations of the frequency measuring circuits 610 and 610_a of FIGS. 7A and 7B.

Figure 8:
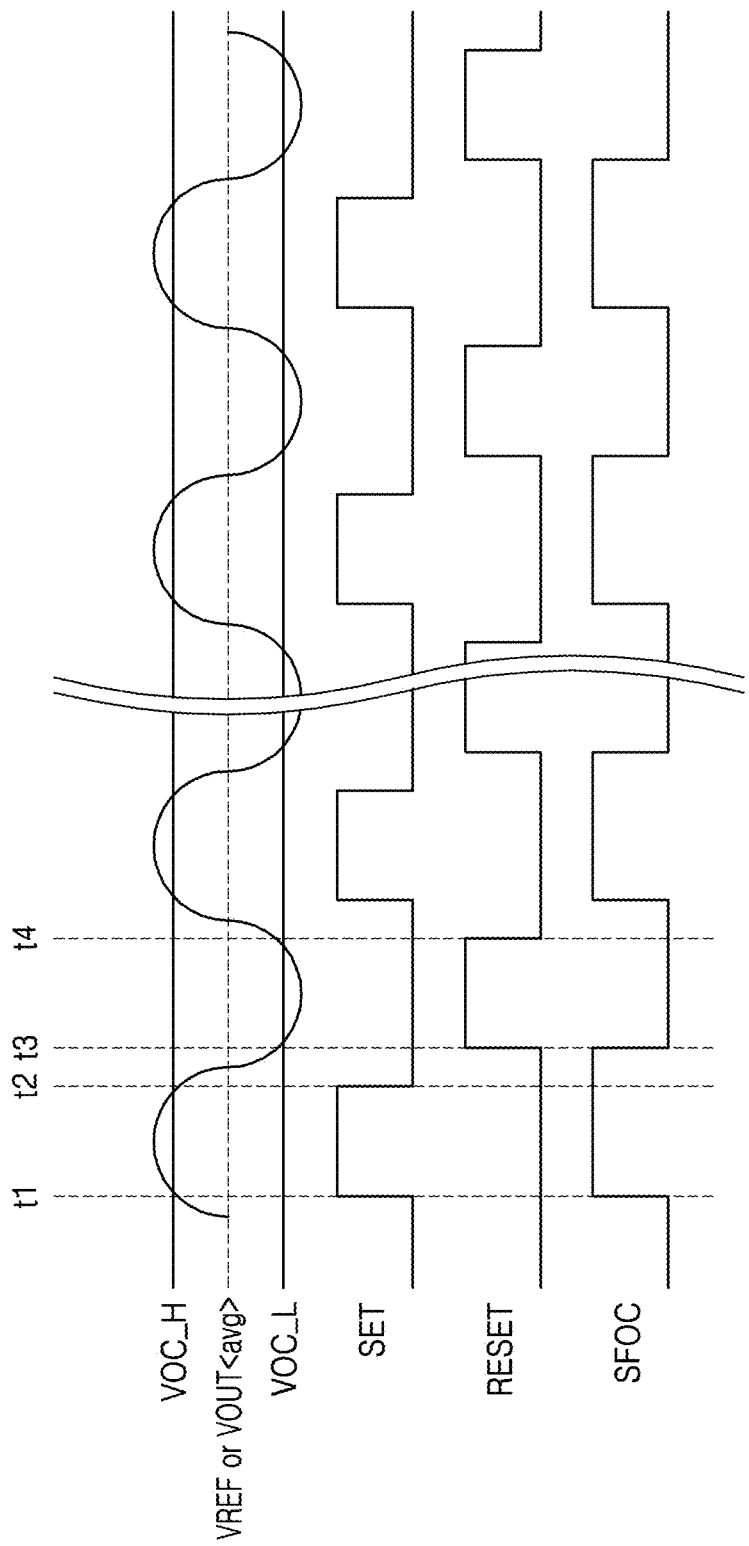
FIG. 8 is a timing diagram illustrating operations of frequency measuring circuits of FIGS. 7A and 7B.

Referring to FIG. 8 together with FIGS. 7A and 7B, a level of the amplified output voltage VOA output from the amplifier 720 may be compared with levels of the first and second reference voltages VOC_H and VOC_L, and the oscillation signal SFOC may be output as a comparison result. The first and second reference voltages VOC_H and VOC_L may be provided based on the reference voltage VREF or the average voltage VOUT<avg> of the output voltage VOUT.

At the point in time t1, when the level of the amplified output voltage VOA is higher than the level of the first reference voltage VOC_H, the set signal SET output from the first comparator 731 may be low-high transited. In synchronization with the low-high transition of the set signal SET, the oscillation signal SFOC having low-high transition may be output from the flip-flop 735.

At the point in time t2, when the level of the amplified output voltage VOA is lower than the level of the first reference voltage VOC_H, the set signal SET output from the first comparator 731 may be high-low transited.

At the point in time t3, when the level of the amplified output voltage VOA is lower than the level of the second reference voltage VOC_L, the reset signal RESET output from the second comparator 732 may be low-high transited. The oscillation signal SFOC output from the flip-flop 735 may be high-low transited in synchronization with the low-high transition of the reset signal RESET.

At the point in time t4, when the level of the amplified output voltage VOA is higher than the level of the second reference voltage VOC_L, the reset signal RESET output from the second comparator 732 may be high-low transited.

As the above-described operation is repeatedly performed, the oscillation signal SFOC output from the flip-flop 735 of the frequency measuring circuits 610 and 610_a is in the form of the repeated pulse. The oscillation signal SFOC having a desired (or alternatively, predetermined) frequency may be provided to the frequency detector 620 of FIG. 9.

Figure 9:
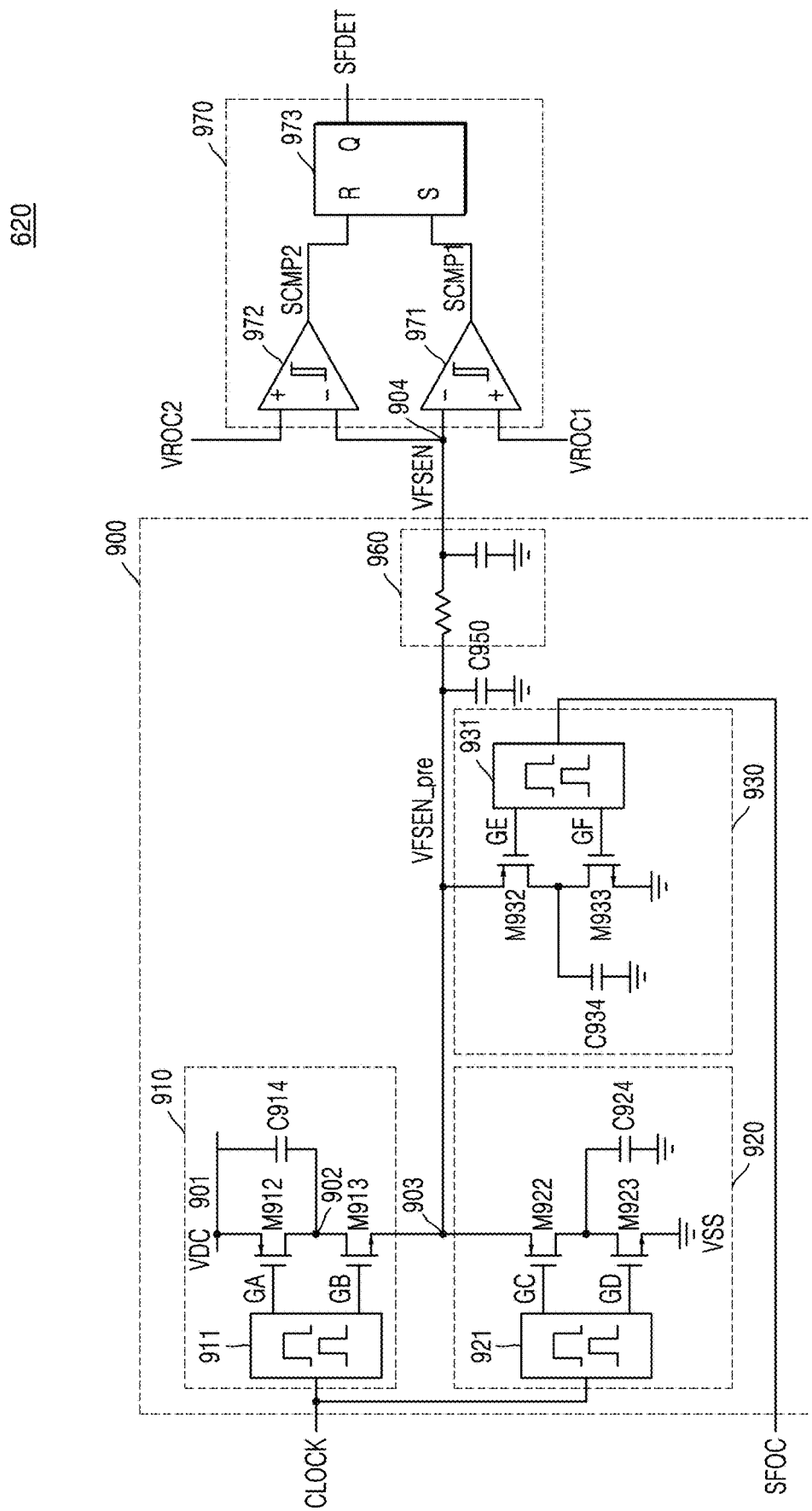
FIGS. 9 and 10 are example circuits illustrating a frequency detector of FIG. 6.
Figure 10:
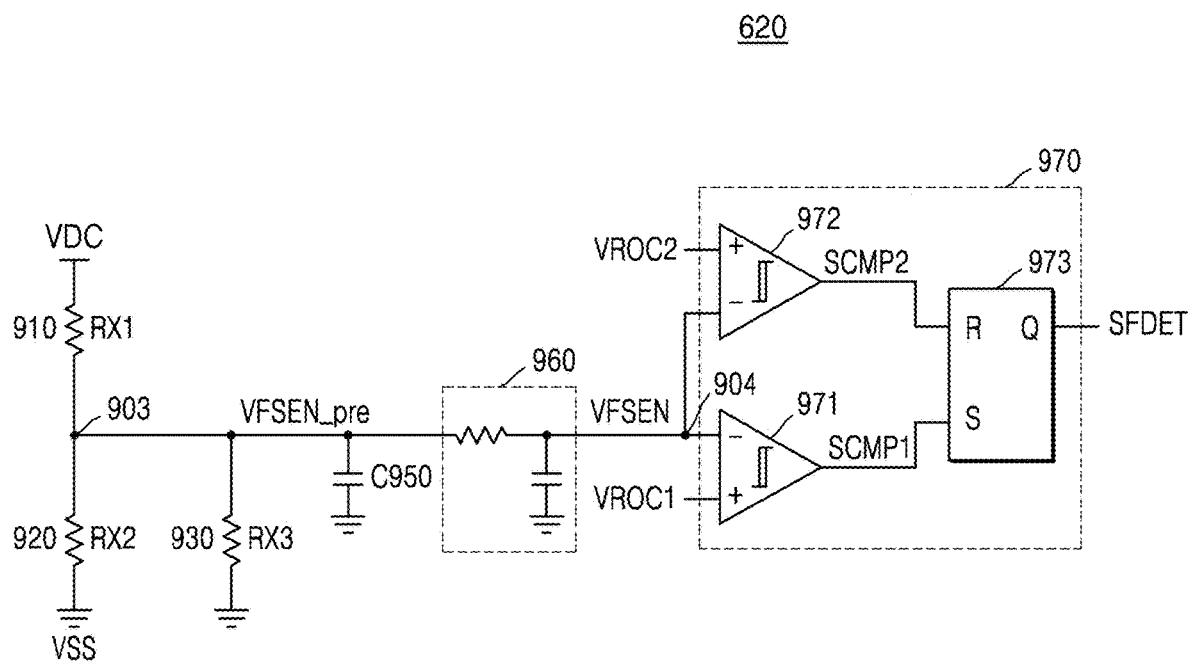

FIGS. 9 and 10 are example circuits illustrating the frequency detector 620 of FIG. 6.

Referring to FIG. 9, the frequency detector 620 may be configured to generate a sensing voltage VFSEN based on the oscillation signal SFOC and the clock signal CLOCK, and generate a detection signal SFDET based on the sensing voltage VFSEN to the first and second threshold voltages (e.g., by comparing the sensing voltage VFSEN to the first and second threshold voltages). The frequency detector 620 may include a sensing voltage generator 900 and a detection signal generator 970.

The sensing voltage generator 900 may be configured to generate the sensing voltage VFSEN based on the clock signal CLOCK and the oscillation signal SFOC. The sensing voltage generator 900 may be configured such that the sensing voltage VFSEN is generated from an internal power voltage VDC in inverse proportion to a frequency of the oscillation signal SFOC by using the frequency of the oscillation signal SFOC and a frequency of the clock signal CLOCK. The sensing voltage generator 900 may include first to third resistors 910, 920, and 930, a capacitor C950, and a low pass filter 960.

Each of the first to third resistors 910, 920, and 930 may include a switched capacitor circuit. The switched capacitor circuit may be induced by a capacitive reactance resistor by repeatedly charging and discharging a capacitor in accordance with an operation frequency. The first resistor 910 and the second resistor 920 may be serially connected between a node of the internal power voltage VDC and the node of the ground voltage VSS. The third resistor 930 may be connected between a node 903 to which the first resistor 910 and the second resistor 920 are connected and the node of the ground voltage VSS. The internal power voltage VDC may be an internal voltage generated by the power converter 100 (FIG. 1) and may have the same level as that of the external power voltage VEXT (FIG. 1). According to an example embodiment, the internal power voltage VDC may have a lower level than that of the external power voltage VEXT.

The first resistor 910 may include a first non-overlap pulse generator 911, first p-channel metal-oxide semiconductor (PMOS) and second n-channel metal-oxide semiconductor (PMOS) transistors M912 and M913, and a first capacitor C914. The first non-overlap pulse generator 911 may receive the clock signal CLOCK and provide first and second gate signals GA and GB so that the first PMOS and second NMOS transistors M912 and M913 are mutually exclusively turned on. That is, the first non-overlap pulse generator 911 may turn off the second NMOS transistor M913 when the first PMOS transistor M912 is turned on and turn on the second NMOS transistor M913 when the first PMOS transistor M912 is turned off. The first PMOS and second NMOS transistors M912 and M913 are serially connected between a node 901 to which the internal power voltage VDC is connected and the node 903, and the first capacitor C914 may be connected between the node 901 and a node 902 to which the first PMOS and second NMOS transistors M912 and M913 are connected.

The first resistor 910 may be modeled as first equivalent resistance RX1, which corresponds to an inverse of capacitive reactance generated by a frequency fsw of the clock signal CLOCK and capacitance C1 of the first capacitor C914, as follows.

$$RX1 \approx \frac{1}{fsw \cdot C1} \qquad \text{[EQUATION 1]}$$

wherein, fsw represents the frequency of the clock signal CLOCK and C1 represents the capacitance of the first capacitor C914.

The second resistor 920 may include a second non-overlap pulse generator 921, third PMOS and fourth NMOS transistors M922 and M923, and a second capacitor C924. The second non-overlap pulse generator 921 may receive the clock signal CLOCK and provide third and fourth gate signals GC and GD so that the third PMOS and fourth NMOS transistors M922 and M923 are mutually exclusively turned on. For example, the capacitance of the second capacitor C924 may be the same as the capacitance C1 of the first capacitor C914. Like the first resistor 910, the second resistor 920 may be modeled by second equivalent resistance RX2 illustrated in EQUATION 2 by repeated charge and discharge of the second capacitor C924 in accordance with the frequency fsw of the clock signal CLOCK.

$$RX2 \approx \frac{1}{fsw \cdot C1} \qquad \text{[EQUATION 2]}$$

wherein, fsw represents the frequency of the clock signal CLOCK and C1 represents the capacitance of the second capacitor C924.

The third resistor 930 may include a third non-overlap pulse generator 931, fifth PMOS and sixth NMOS transistors M932 and M933, and a third capacitor C934. The third non-overlap pulse generator 931 may receive the oscillation signal SFOC and provide fifth and sixth gate signals GE and GF so that the fifth PMOS and sixth NMOS transistors M932 and M933 are mutually exclusively turned on. The third resistor 930 may be modeled by a third equivalent resistance RX3 illustrated in EQUATION 3 by repeated charge and discharge of the third capacitor C934 in accordance with a frequency foc of the oscillation signal SFOC.

$$RX3 \approx \frac{1}{foc \cdot C3} \qquad \text{[EQUATION 3]}$$

wherein, foc represents the frequency of the oscillation signal SFOC and C3 represents the capacitance of the third capacitor C934.

In order to simplify the drawing, the frequency detector 620, in which the first to third resistors 910, 920, and 930 of FIG. 9 are modeled and modified to the first to third equivalent resistances RX1, RX2, and RX3, are illustrated in FIG. 10.

Referring to FIG. 10, in the sensing voltage generator 900 included in the frequency detector 620, the first equivalent resistance RX1 of the first resistor 910 and the second equivalent resistance RX2 of the second resistor 920 are serially connected between the node 903 of the internal power voltage VDC and the node of the ground voltage VSS, and the third equivalent resistance RX3 of the third resistor 930 and the capacitor C950 may be connected between the node 903 and the node of the ground voltage VSS. The node 903 may output a pre-sensing voltage VFSEN_pre in a path in which the internal power voltage VDC is divided in proportion to the first to third equivalent resistances RX1, RX2, and RX3 and charge the capacitor C950.

As illustrated in EQUATIONS 1 and 2, values of the first and second equivalent resistances RX1 and RX2 may be dominant over the frequency fsw of the clock signal CLOCK. The clock signal CLOCK may be generated by the clock generator 240 (FIG. 2) at a particular frequency. The frequency fsw of the clock signal CLOCK may belong to the switching frequency range fsw (FIG. 5). In this case, the values of the first and second equivalent resistances RX1 and RX2 may be a fixed resistance value corresponding to the switching frequency. The value of the third equivalent resistance RX3 of EQUATION 3 may be determined by the frequency foc of the oscillation signal SFOC, and vary in accordance with a change in the frequency foc of the oscillation signal SFOC.

The pre-sensing voltage VFSEN_pre of the node 903 may include voltage ripple noise and/or switching noise generated by the change in the frequency foc of the oscillation signal SFOC. The pieces of noise of the pre-sensing voltage VFSEN_pre may be removed through the capacitor C950 and the low pass filter 960. The sensing voltage VFSEN obtained by removing the pieces of noise from the pre-sensing voltage VFSEN_pre may be provided to a first comparator 971 connected to an output node 904 of the low pass filter 960. The sensing voltage VFSEN may be calculated from the internal power voltage VDC in proportion to the first to third equivalent resistances RX1, RX2, and RX3 as illustrated in EQUATION 4.

$$VFSEN = VDC \times \frac{RX2}{RX1 + RX2\left(1 + \frac{RX1}{RX3}\right)} \qquad \text{[EQUATION 4]}$$

wherein, VDC represents the internal power voltage, RX1 represents the first equivalent resistance of the first resistor 910, RX2 represents the second equivalent resistance of the second resistor 920, and RX3 represents the third equivalent resistance of the third resistor 930.

In EQUATION 4, when the values of the first and second equivalent resistances RX1 and RX2 are equal to each other and the frequency foc of the oscillation signal SFOC belongs to a low frequency band, since the value of the third equivalent resistance RX3 approaches a high resistance value, the sensing voltage VFSEN may be about VDC/2. Thus, when the frequency foc of the oscillation signal SFOC gradually increases, a level of the sensing voltage VFSEN gradually decreases from VDC/2 as the value of the third equivalent resistance RX3 gradually decreases.

The detection signal generator 970 may be configured to generate the detection signal SFDET based on the sensing voltage VFSEN and first and second threshold voltages VROC1 and VROC2. For example, the detection signal generator 970 may be configured to compare the sensing voltage VFSEN with first and second threshold voltages VROC1 and VROC2 and generate the detection signal SFDET as a comparison result. The first and second threshold voltages VROC1 and VROC2 may be determined by a lower limit frequency fL1 and an upper limit frequency fU2 that represent upper and lower boundaries of the oscillation frequency detection range fdet (FIG. 5). A correlation between the lower limit frequency fL1 of the oscillation frequency detection range fdet and the first threshold voltage VROC1 is illustrated in EQUATION 5 and a correlation between the upper limit frequency fU2 of the oscillation frequency detection range fdet and the second threshold voltage VROC2 may be illustrated in EQUATION 6.

$$fL1 = \frac{\frac{VDC}{VROC1} - 2}{RX \times C3}$$ [EQUATION 5]

$$fU2 = \frac{\frac{VDC}{VROC2} - 2}{RX \times C3}$$ [EQUATION 6]

wherein, RX represents a resistance value when the first equivalent resistance RX1 of the first resistor 910 is the same as the second equivalent resistance RX2 of the second resistor 920 and C3 represents capacitance of the third capacitor C934 of the third resistor 930.

When the lower limit frequency fL1 of the oscillation frequency detection range fdet is set, the first threshold voltage VROC1 may be calculated by using EQUATION 5. When the upper limit frequency fU2 of the oscillation frequency detection range fdet is set, the second threshold voltage VROC2 may be calculated by using EQUATION 6. In EQUATIONS 5 and 6, due to inverse relationships between the frequencies and the threshold voltages, a level of the first threshold voltage VROC1 is higher than a level of the second threshold voltage VROC2.

The first comparator 971 may receive the sensing voltage VFSEN at an inverting input terminal (−) and may receive the first threshold voltage VROC1 at a non-inverting input terminal (+). The first comparator 971 may output a first comparison signal SCMP1 by comparing the level of the sensing voltage VFSEN with the level of the first threshold voltage VROC1. When the sensing voltage VFSEN is higher than the first threshold voltage VROC1, the first comparator 971 may output the first comparison signal SCMP1 with a logic low level. When the sensing voltage VFSEN is lower than the first threshold voltage VROC1, the first comparator 971 may output the first comparison signal SCMP1 with a logic high level. The first comparison signal SCMP1 may be provided to a set input terminal S of a flip-flop 973.

For example, the first comparator 971 may be configured to use time or voltage hysteresis. Rather than immediately outputting the first comparison signal SCMP1 with the logic high level as soon as the level of the sensing voltage VFSEN is lower than or the same as the level of the first threshold voltage VROC1, the first comparator 971 may output the first comparison signal SCMP1 with the logic high level when the level of the sensing voltage VFSEN is lower than or the same as the level of the first threshold voltage VROC1 for a desired (or alternatively, predetermined) amount of time.

The second comparator 972 may receive the sensing voltage VFSEN at an inverting input terminal (−) and may receive the second threshold voltage VROC2 at a non-inverting input terminal (+). The second comparator 972 may output a second comparison signal SCMP2 by comparing the level of the sensing voltage VFSEN with the level of the second threshold voltage VROC2. When the sensing voltage VFSEN is higher than the second threshold voltage VROC2, the second comparator 972 may output the second comparison signal SCMP2 with a logic low level. When the sensing voltage VFSEN is lower than the second threshold voltage VROC2, the second comparator 972 may output the second comparison signal SCMP2 with a logic high level. The second comparison signal SCMP2 may be provided to a reset input terminal R of the flip-flop 973.

For example, the second comparator 972 may be configured to use time or voltage hysteresis. Rather than immediately outputting the second comparison signal SCMP2 with the logic high level as soon as the level of the sensing voltage VFSEN is lower than or the same as the level of the second threshold voltage VROC2, the second comparator 972 may output the second comparison signal SCMP2 with the logic high level when the level of the sensing voltage VFSEN is lower than or the same as the level of the second threshold voltage VROC2 for a desired (or alternatively, predetermined) amount of time.

The flip-flop 973 may output the detection signal SFDET in response to the first comparison signal SCMP1 and the second comparison signal SCMP2 that are input to the set and reset input terminals S and R. The detection signal SFDET may have low-high transition in synchronization with low-high transition of the first comparison signal SCMP1 input to the set input terminal S and may have high-low transition in synchronization with low-high transition of the second comparison signal SCMP2 input to the reset input terminal R. That is, the detection signal SFDET may be output as a square wave having a high level period based on the first comparison signal SCMP1 and the second comparison signal SCMP2.

Figure 11:
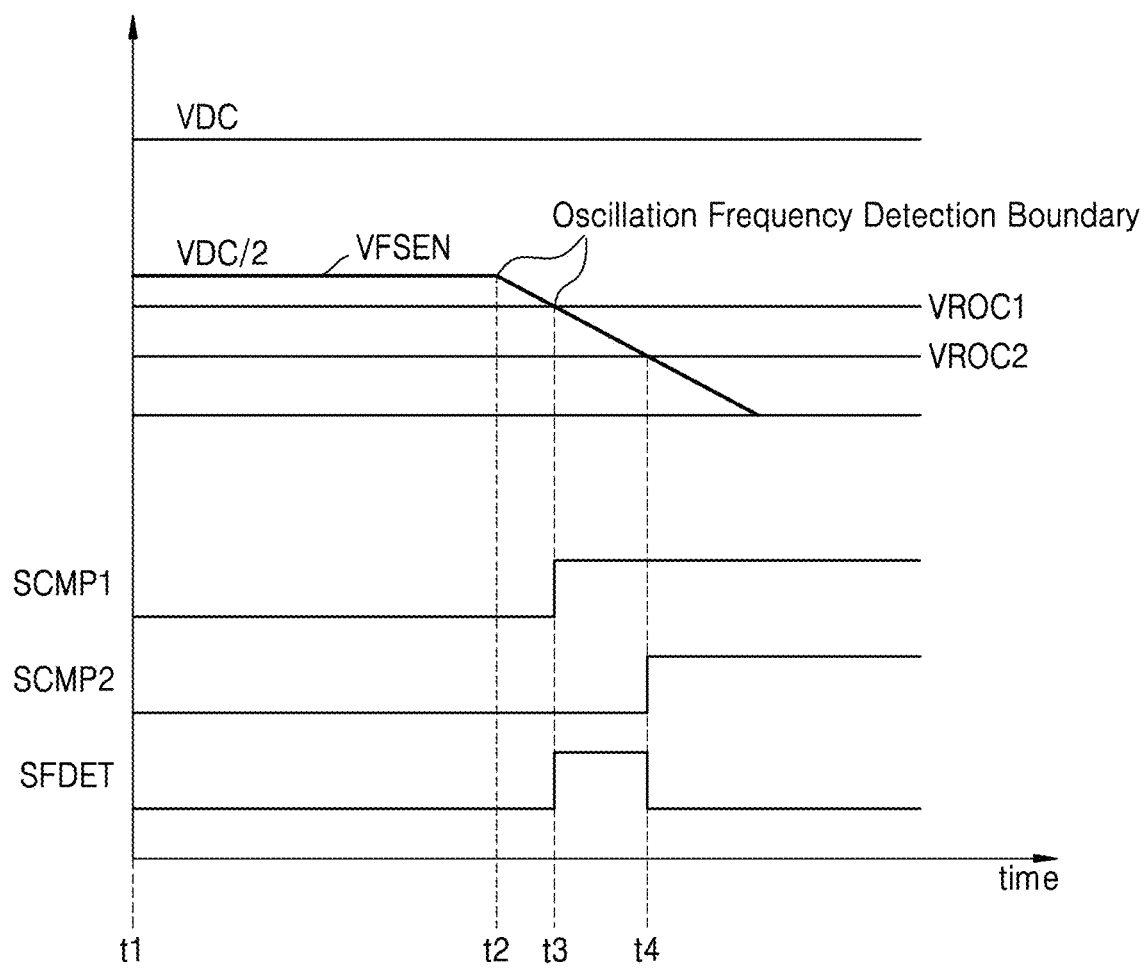
FIG. 11 is a timing diagram illustrating an operation of the frequency detector of FIGS. 9 and 10.

FIG. 11 is a timing diagram illustrating an operation of the frequency detector 620 of FIGS. 9 and 10.

Referring to FIG. 11 together with FIGS. 9 and 10, the level of the sensing voltage VFSEN output from the sensing voltage generator 900 may be compared with the levels of the first and second threshold voltages VROC1 and VROC2, and the detection signal SFDET may be output as a comparison result. The first and second threshold voltages VROC1 and VROC2 may be provided based on the lower limit frequency fL1 and the upper limit frequency fU2 of the oscillation frequency detection range fdet.

At the point in time t1, when the frequency foc of the oscillation signal SFOC belongs to the low frequency band, the sensing voltage VFSEN is divided from the internal power voltage VDC and may have a level of about VDC/2.

At the point in time t2, as the frequency foc of the oscillation signal SFOC increases, the sensing voltage VFSEN may gradually decrease from VDC/2.

At the point in time t3, when the level of the sensing voltage VFSEN is lower than the level of the first threshold voltage VROC1, the first comparison signal SCMP1 output from the first comparator 971 may be low-high transited. From the flip-flop 973, in synchronization with the low-high transition of the first comparison signal SCMP1 input to the set terminal S, the detection signal SFDET having low-high transition may be output.

At the point in time t4, when the level of the sensing voltage VFSEN is lower than the level of the second threshold voltage VROC2, the second comparison signal SCMP2 output from the second comparator 972 may be low-high transited. From the flip-flop 973, in synchronization with the low-high transition of the second comparison signal SCMP2 input to the reset terminal R, the detection signal SFDET having high-low transition may be output.

As described above, the detection signal SFDET may be output from the frequency detector 620 as the square wave having the high level period in a period in which the sensing voltage VFSEN is lower than the first threshold voltage VROC1 and is higher than the second threshold voltage VROC2. The detection signal SFDET may be output to correspond to an oscillation frequency detection boundary determined by the lower limit frequency fL1 and the upper limit frequency fU2 of the oscillation frequency detection range fdet. The detection signal SFDET in the form of the square wave may be provided to the duty cycle detector 630 of FIG. 12.

Figure 12A:
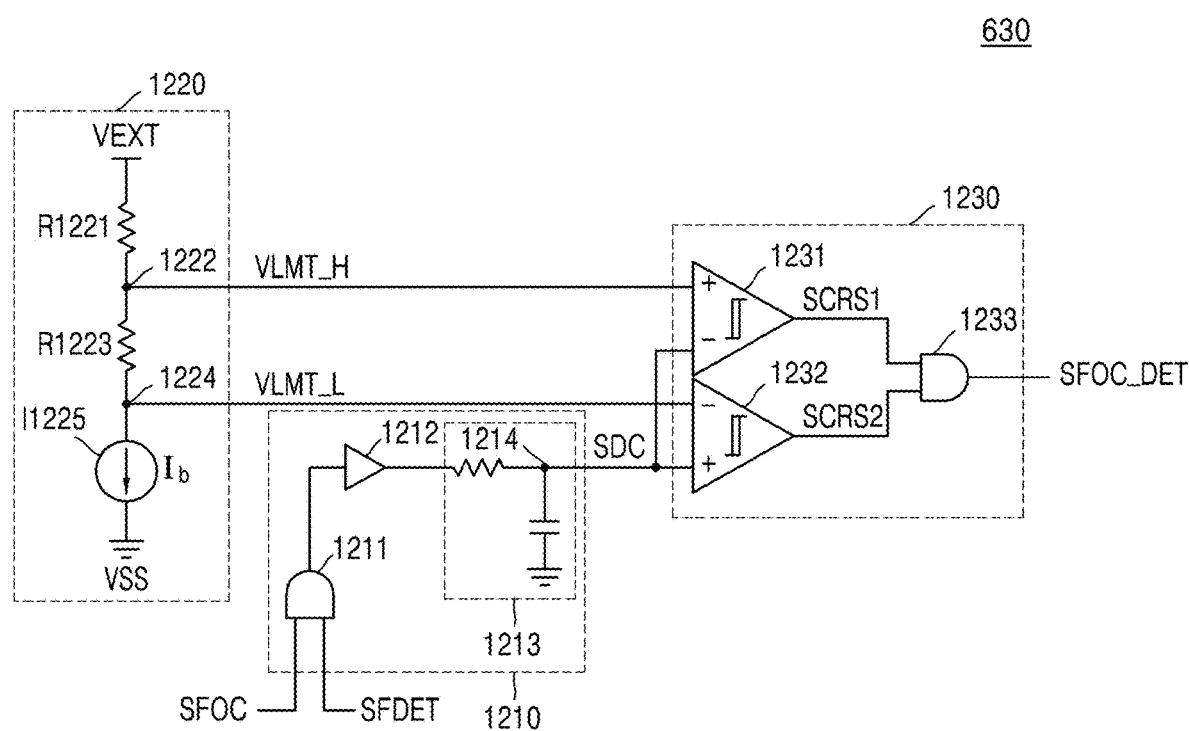
FIGS. 12A to 12C shows an example circuit and associated graphs illustrating the duty cycle detector of FIG. 6.
Figure 12B:
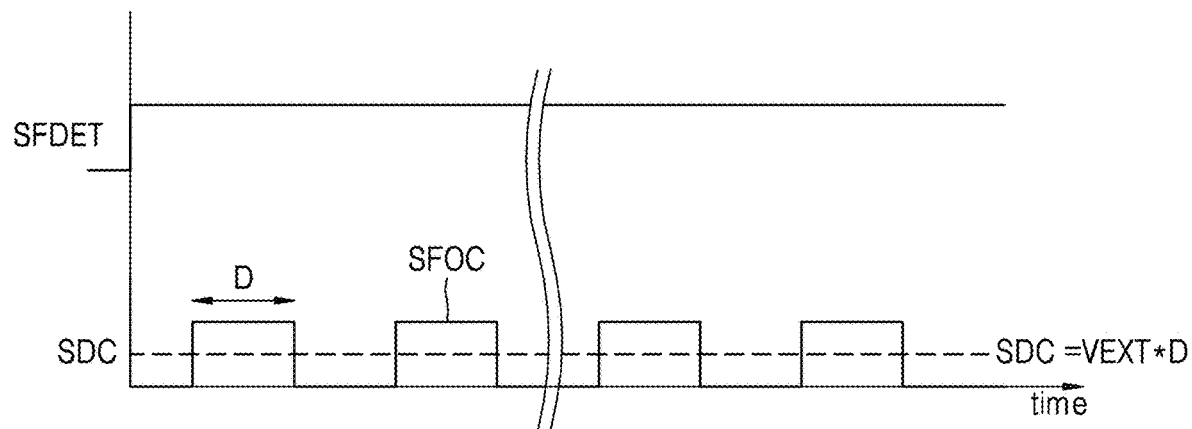
Figure 12C:
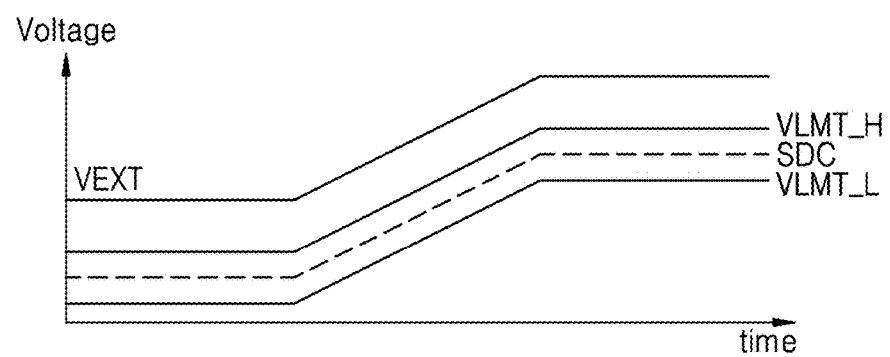

FIGS. 12A to 12C shows an example circuit and associated graphs illustrating the duty cycle detector 630 of FIG. 6.

Referring to FIG. 12A, the duty cycle detector 630 may generate the oscillation detection signal SFOC_DET that represents the oscillation of the output voltage VOUT of the switching regulator 110 (FIG. 2) by detecting a duty cycle of the oscillation signal SFOC output from the frequency measuring circuits 610 and 610_a (FIGS. 7A and 7B). The oscillation detection signal SFOC_DET may be output to the outside of the power converter 100 (FIG. 1). The duty cycle detector 630 may include a duty cycle signal estimating circuit 1210, a limit voltage generator 1220, and a decision circuit 1230.

The duty cycle signal estimating circuit 1210 may receive the oscillation signal SFOC and the detection signal SFDET and estimate a duty cycle signal SDC based on the oscillation signal SFOC in the high level period of the detection signal SFDET. The duty cycle signal estimating circuit 1210 may include an AND gate logic circuit 1211 for inputting the oscillation signal SFOC and the detection signal SFDET, a buffer 1212 for buffering an output of the AND gate logic circuit 1211, and a low pass filter 1213 for extracting an average voltage related to the output of the AND gate logic circuit 1211.

The average voltage extracted by the low pass filter 1213 may be output as the duty cycle signal SDC and may be provided to the decision circuit 1230 through a node 1214. For example, referring to FIG. 12B, when the AND gate logic circuit 1211 and the buffer 1212 are driven by the external power voltage VEXT, the duty cycle signal SDC may have a voltage level corresponding to an arithmetic product of VEXT and the duty cycle D (or on-time or the high level period) of the oscillation signal SFOC in the high level period of the detection signal SFDET.

The limit voltage generator 1220 may include a first resistor R1221, a second resistor R1223, and a current source I1225 that are serially connected between the node of the external power voltage VEXT and the node of the ground voltage VSS. A uniform current Ib may flow through the current source I1225. A uniform voltage may be detected in a node 1222 to which the first resistor R1221 and the second resistor R1223 are connected and a node 1224 to which the second resistor R1223 and the current source I1225 are connected through a current path in which the uniform current Ib flows. A first limit voltage VLMT_H is output from the node 1222, a second limit voltage VLMT_L is output from the node 1224, and the first limit voltage VLMT_H may be higher than the second limit voltage VLMT_L.

The first and second limit voltages VLMT_H and VLMT_L may be divided in proportion to the first and second resistors R1221 and R1223, and may be output based on the external power voltage VEXT. Further, the duty cycle signal SDC may be output from the external power voltage VEXT based on the duty cycle of the oscillation signal SFOC. A battery voltage used as the external power voltage VEXT may have change in accordance with an external state. At this time, the first and second limit voltages VLMT_H and VLMT_L and the duty cycle signal SDC may have voltage levels that adaptively vary in accordance with the change in the external power voltage VEXT, as illustrated in FIG. 12C.

The first and second limit voltages VLMT_H and VLMT_L and the duty cycle signal SDC may be provided to the decision circuit 1230. The decision circuit 1230 may compare the voltage level of the duty cycle signal SDC with the first and second limit voltages VLMT_H and VLMT_L.

The decision circuit 1230 may include first and second comparators 1231 and 1232 and an AND gate logic circuit 1233. The first comparator 1231 may receive the duty cycle signal SDC at an inverting input terminal (−) and receive the first limit voltage VLMT_H at a non-inverting input terminal (+). The first comparator 1231 may output a first cross signal SCRS1 by comparing the voltage level of the duty cycle signal SDC with the level of the first limit voltage VLMT_H. When the voltage level of the duty cycle signal SDC is higher than the level of the first limit voltage VLMT_H, the first comparator 1231 may output the first cross signal SCRS1 with a logic low level. When the voltage level of the duty cycle signal SDC is lower than the level of the first limit voltage VLMT_H, the first cross signal SCRS1 may be output with a logic high level.

For example, the first comparator 1231 may be configured to use time or voltage hysteresis. Rather than immediately outputting the first cross signal SCRS1 with a logic low level as soon as the voltage level of the duty cycle signal SDC is higher than or the same as the level of the first limit voltage VLMT_H, the first comparator 1231 may output the first cross signal SCRS1 with the logic low level when the voltage level of the duty cycle signal SDC is higher than or the same as the level of the first limit voltage VLMT_H for a desired (or alternatively, predetermined) amount of time.

The second comparator 1232 may receive the second limit voltage VLMT_L at an inverting input terminal (−) and receive the duty cycle signal SDC at a non-inverting input terminal (+). The second comparator 1232 may output a second cross signal SCRS2 by comparing the voltage level of the duty cycle signal SDC with a level of the second limit voltage VLMT_L. When the voltage level of the duty cycle signal SDC is higher than the level of the second limit voltage VLMT_L, the second comparator 1232 may output the second cross signal SCRS2 with a logic high level. When the voltage level of the duty cycle signal SDC is lower than the level of the second limit voltage VLMT_L, the second cross signal SCRS2 may be output with a logic low level.

For example, the second comparator 1232 may be configured to use time or voltage hysteresis. Rather than immediately outputting the second cross signal SCRS2 with the logic high level as soon as the voltage level of the duty cycle signal SDC is higher than or the same as the level of the second limit voltage VLMT_L, the second comparator 1232 may output the second cross signal SCRS2 with the logic high level when the voltage level of the duty cycle signal SDC is higher than or the same as the level of the second limit voltage VLMT_L for a desired (or alternatively, predetermined) amount of time.

The first cross signal SCRS1 may be a signal representing that an oscillation that deviates from the oscillation frequency detection range fdet (FIG. 5) occurs when the voltage level of the duty cycle signal SDC crosses the level of the first limit voltage VLMT_H. The second cross signal SCRS2 may be a signal representing that an oscillation that belongs to the oscillation frequency detection range fdet occurs when the voltage level of the duty cycle signal SDC crosses the level of the second limit voltage VLMT_L. When the voltage level of the duty cycle signal SDC belongs to the oscillation frequency detection range fdet, the first and second cross signals SCRS1 and SCRS2 may be output with logic high levels.

The AND gate logic circuit 1233 may output the oscillation detection signal SFOC_DET by inputting the first cross signal SCRS1 and the second cross signal SCRS2 and performing an AND operation on the first and second cross signals SCRS1 and SCRS2. The oscillation detection signal SFOC_DET may be output with a logic high level in response to the first and second cross signals SCRS1 and SCRS2 with the logic high levels. The oscillation detection signal SFOC_DET with the logic high level may be configured to be provided to a PMIC or a system outside the power converter 100 (FIG. 1) and to inform the PMIC or the system of the oscillation of the output voltage VOUT.

Figure 13:
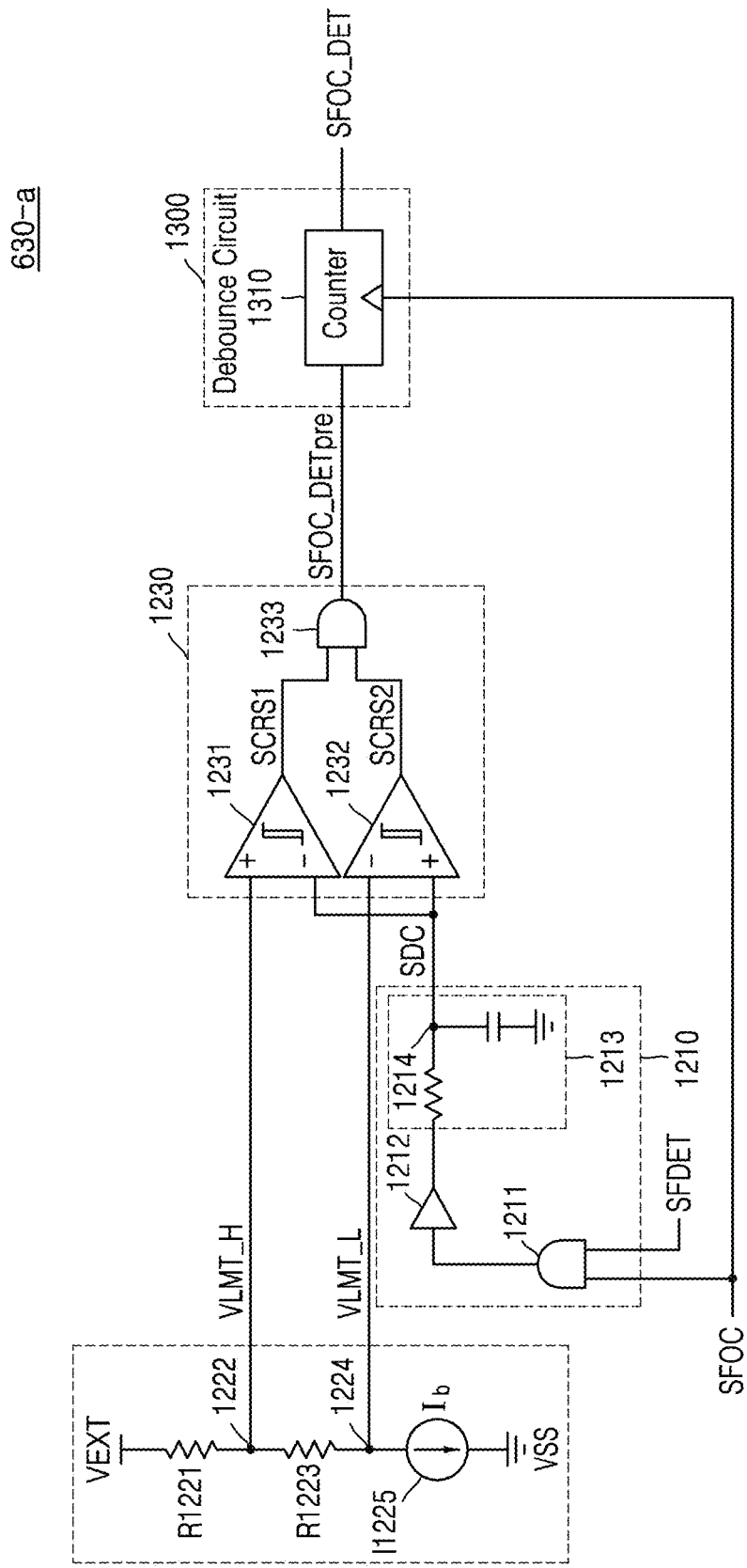
FIG. 13 is an example circuit illustrating a duty cycle detector of FIG. 6.

FIG. 13 is an example circuit illustrating the duty cycle detector 630 of FIG. 6.

Referring to FIG. 13, in comparison with the duty cycle detector 630 of FIG. 12A, in the duty cycle detector 630_a, an output SFOC_DETpre of the AND gate logic circuit 1233 of the decision circuit 1230 is output to a debounce circuit 1300 to generate the oscillation detection signal SFOC_DET through a debounce circuit 1300.

The duty cycle detector 630_a may generate the first and second cross signals SCRS1 and SCRS2 based on the voltage level of the duty cycle signal SDC output from the duty cycle signal estimating circuit 1210 and the first and second limit voltages VLMT_H and VLMT_L (e.g., by comparing the voltage level of the duty cycle signal SDC output from the duty cycle signal estimating circuit 1210 with the first and second limit voltages VLMT_H and VLMT_L), and generate a preliminary oscillation detection signal SFOC_DETpre by performing an AND operation on the first and second cross signals SCRS1 and SCRS2. The duty cycle detector 630_a may inform the outside of the power converter 100 (FIG. 1) of whether the output voltage VOUT oscillates as the oscillation detection signal SFOC_DET. It is desirable to confirm whether the oscillation detection signal SFOC_DET is not a substantial oscillation (referring to an oscillation not associated with a noise state), but is an erroneous operation caused by a noise state.

The debounce circuit 1300 may include a counter 1310 configured to receive the preliminary oscillation detection signal SFOC_DETpre and the oscillation signal SFOC and generate the oscillation detection signal SFOC_DET based on an amount of counting time of the counter 1310 in accordance with the oscillation signal SFOC. The counter 1310 may perform a counting operation by adjusting a logic high level period of the preliminary oscillation detection signal SFOC_DETpre to the frequency of the oscillation signal SFOC.

In the logic high level period of the preliminary oscillation detection signal SFOC_DETpre, in accordance with the oscillation signal SFOC, the counting operation of the counter 1310 may be continuously performed, which means the preliminary oscillation detection signal SFOC_DETpre is generated by the substantial oscillation. The debounce circuit 1300 may output the input preliminary oscillation detection signal SFOC_DETpre as the oscillation detection signal SFOC_DET. At this time, rather than immediately outputting the oscillation detection signal SFOC_DET as soon as the counting operation of the counter 1310 starts, the debounce circuit 1300 may be configured to output the oscillation detection signal SFOC_DET after a desired (or alternatively, predetermined) amount of time. Therefore, the substantial oscillation may be correctly determined by the debounce circuit 1300.

In the debounce circuit 1300, when the counting operation in accordance with the oscillation signal SFOC is not performed or is temporarily performed and stops in the logic high level period of the preliminary oscillation detection signal SFOC_DETpre, it means that the preliminary oscillation detection signal SFOC_DETpre is generated by a noise. At this time, the debounce circuit 1300 may be configured not to output the oscillation detection signal SFOC_DET regardless of generation of the logic high level of the preliminary oscillation detection signal SFOC_DETpre.

Figure 14:
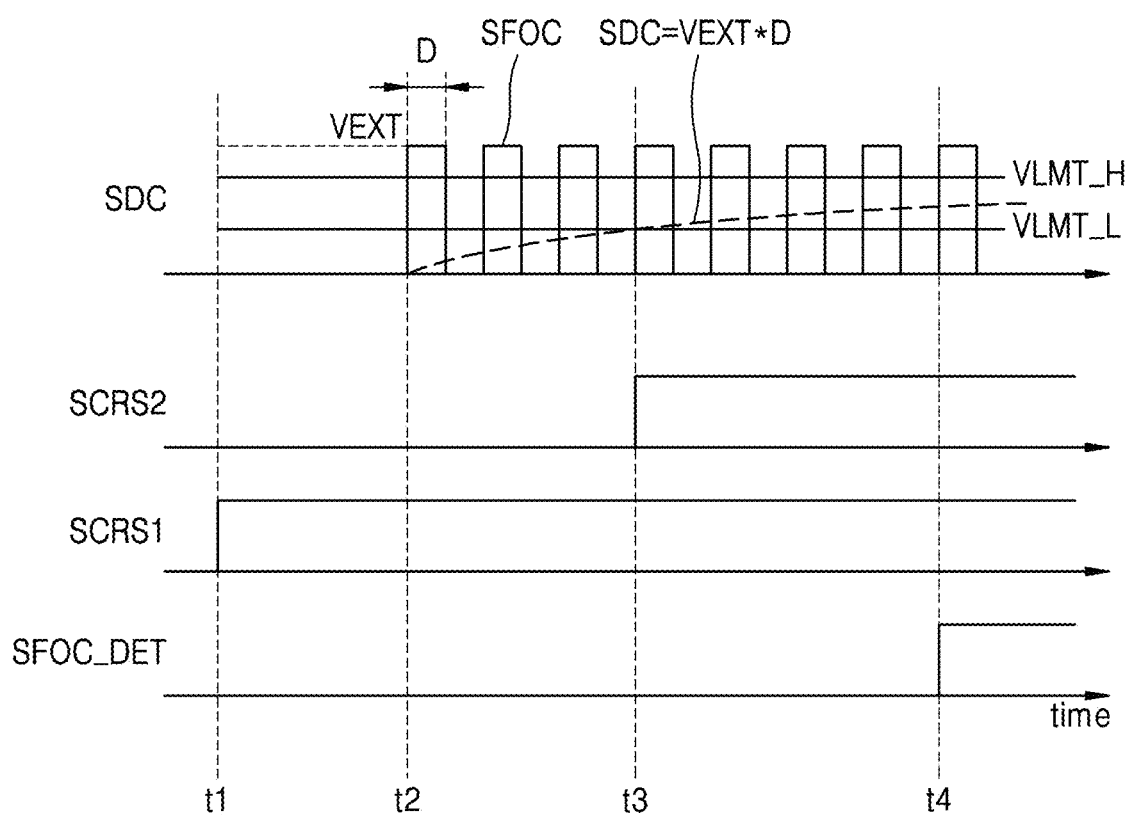
FIG. 14 is a timing diagram illustrating an operation of a duty cycle detector of FIG. 13.

FIG. 14 is a timing diagram illustrating an operation of the duty cycle detector 630_a of FIG. 13.

Referring to FIG. 14 together with FIGS. 12A to 12C and 13, a voltage level of the duty cycle signal SDC output from the duty cycle signal estimating circuit 1210 may be compared with levels of the first and second limit voltages VLMT_H and VLMT_L, and the oscillation detection signal SFOC_DET may be output as a comparison result. The first limit voltage VLMT_H may be provided to detect whether the duty cycle signal SDC deviates from the oscillation frequency detection range fdet and the second limit voltage VLMT_L may be provided to detect whether the duty cycle signal SDC belongs to the oscillation frequency detection range fdet.

At the point in time t1, the voltage level of the duty cycle signal SDC may start to be compared with the levels of the first and second limit voltages VLMT_H and VLMT_L. As an initial setup, the first cross signal SCRS1 is output with a logic high level and the second cross signal SCRS2 is output with a logic low level.

At the point in time t2, the voltage level of the duty cycle signal SDC may increase based on a duty cycle D of the oscillation signal SFOC from the external power voltage VEXT.

At the point in time t3, when the voltage level of the duty cycle signal SDC increases and the voltage level of the duty cycle signal SDC crosses the level of the second limit voltage VLMT_L, the second cross signal SCRS2 may be output with a logic high level. At this time, the preliminary oscillation detection signal SFOC_DETpre may be output with a logic high level in response to the first and second cross signals SCRS1 and SCRS2 with the logic high level.

At the point in time t4, the debounce circuit 1300 that receives the preliminary oscillation detection signal SFOC_DETpre may perform the counting operation of the counter 1310 in accordance with the frequency of the oscillation signal SFOC. The point in time t4 may be a point in time at which a desired (or alternatively, predetermined) amount of time passes while performing the counting operation. At the point in time t4, the oscillation detection signal SFOC_DET by which the preliminary oscillation detection signal SFOC_DETpre is determined as having the substantial oscillation may be output.

Figure 15:
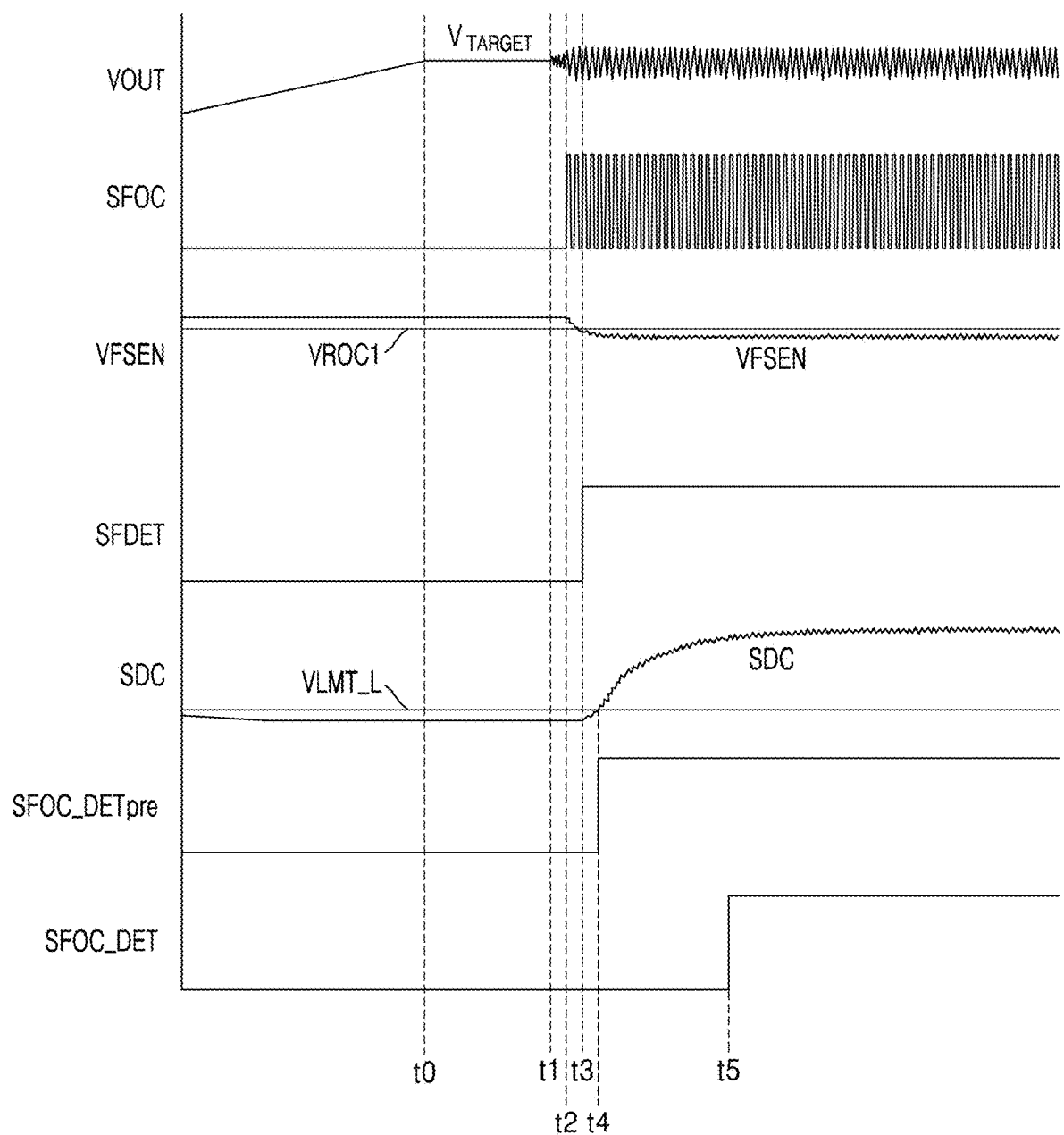
FIG. 15 is a timing diagram illustrating an operation of the power converter according to an example embodiment of the inventive concepts.

FIG. 15 is a timing diagram illustrating an operation of the power converter 100 according to an example embodiment of the inventive concepts. FIG. 15 is described with reference to FIGS. 1 to 14. In the power converter 100, the switching regulator 110 may receive the external power voltage VEXT and generate the output voltage VOUT with a target level $V_{TARGET}$ and the oscillation detector 120 may determine whether the oscillation of the output voltage VOUT belongs to the oscillation frequency detection range fdet to be detected and output the oscillation detection signal SFOC_DET.

Referring to FIG. 15, at a point in time t0, the output voltage VOUT of the switching regulator 110 may have the target level $V_{TARGET}$.

At the point in time t1, the oscillation of the output voltage VOUT may occur.

At the point in time t2, the frequency measuring circuit 610 may generate the oscillation signal SFOC by amplifying the output voltage VOUT and comparing the level of the amplified output voltage VOA with the levels of the first and second reference voltages VOC_H and VOC_L. The frequency detector 620 may generate the sensing voltage VFSEN based on the oscillation signal SFOC and the clock signal CLOCK, and may compare the sensing voltage VFSEN with the first and second threshold voltages VFROC1 and VROC2.

At the point in time t3, when the sensing voltage VFSEN is lower than a first threshold voltage VFROC1 determined by the lower limit frequency fL1 of the oscillation frequency detection range fdet, the frequency detector 620 may generate the detection signal SFDET. The duty cycle detector 630 may generate the duty cycle signal SDC based on the oscillation signal SFOC and the detection signal SFDET and may compare the voltage level of the duty cycle signal SDC with the levels of the first and second limit voltages VLMT_H and VLMT_L.

At the point in time t4, when the voltage level of the duty cycle signal SDC is higher than the level of the second limit voltage VLMT_L that represents whether the voltage level of the duty cycle signal SDC belongs to the oscillation frequency detection range fdet, the duty cycle detector 630_a may output the preliminary oscillation detection signal SFOC_DETpre. The debounce circuit 1300 may receive the preliminary oscillation detection signal SFOC_DETpre, and perform the counting operation of the counter 1310 in accordance with the oscillation signal SFOC.

At a point in time t5, when a desired (or alternatively, predetermined) amount of time passes while performing the counting operation of the counter 1310, the duty cycle detector 630_a may output the oscillation detection signal SFOC_DET by which the preliminary oscillation detection signal SFOC_DETpre is determined as the substantial oscillation.

Figure 16:
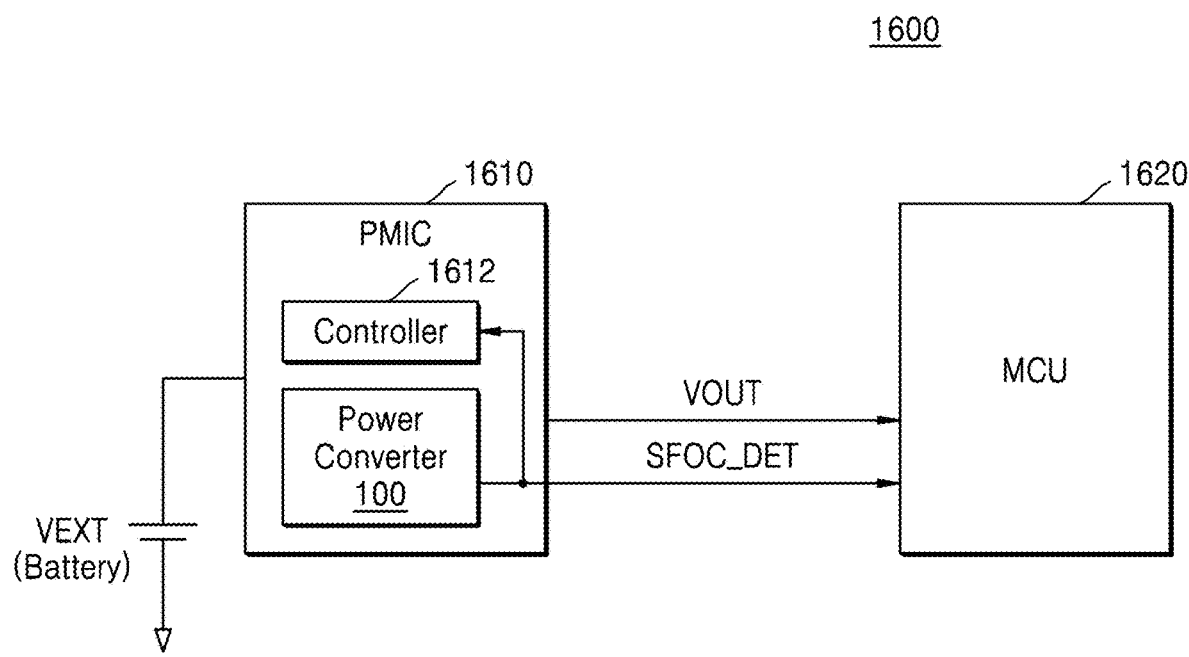
FIG. 16 is a block diagram illustrating a system that adopts the power converter according to an example embodiment of the inventive concepts.

FIG. 16 is a block diagram illustrating a system 1600 that adopts the power converter 100 according to an example embodiment of the inventive concepts.

Referring to FIG. 16, the system 1600 may include a PMIC 1610 and a micro-controller unit (MCU) 1620. The MCU 1620 may be a processor for executing an operating system (OS) of the system 1600 and a plurality of software systems and performing particular calculations or tasks. The PMIC 1610 may include a controller 1612 for managing and controlling power provided by the power converter 100 according to an example embodiment of the inventive concepts and a battery. The power converter 100 may generate the output voltage VOUT with the target level by converting the external power voltage VEXT provided by the battery. The power converter 100 may output the oscillation detection signal SFOC_DET by detecting the oscillation that occurs in the output voltage VOUT and determining whether the oscillation of the output voltage VOUT belongs to the oscillation frequency detection range fdet to be detected by the oscillation of the output voltage VOUT.

The oscillation detection signal SFOC_DET may be output to the controller 1612 of the PMIC 1610 and the MCU 1620.

The PMIC 1610 and/or the MCU 1620 may perform a relatively stable operation based on the oscillation detection signal SFOC_DET. The PMIC 1610 and/or the MCU 1620 may be implemented in a form of hardware or software. For example, the PMIC 1610 and/or the MCU 1620 may be controlled so that the operation of the switching regulator 110 in the power converter is disabled until the oscillation that occurs in the output voltage VOUT disappears in response to the oscillation detection signal SFOC_DET. Therefore, the PMIC 1610 and/or the MCU 1620 may improve operation stability.

While the inventive concepts have been particularly shown and described with reference to some example embodiments thereof, it will be understood that various changes in form and details may be made therein without departing from the spirit and scope of the following claims.

What is claimed is:

1. A power converter for receiving an external power voltage and generating an output voltage with a target level, the power converter comprising:
   a switching regulator configured to perform switching so that an inductor is alternatingly connected to or isolated from the external power voltage and generate the output voltage by a current that flows through the inductor; and
   an oscillation detector configured to detect oscillation that occurs in the output voltage and output an oscillation detection signal by determining whether the oscillation belongs to an oscillation frequency detection range to be detected by the oscillation detector.

2. The power converter of claim 1, wherein
   the oscillation detector is configured to output the oscillation detection signal to an outside of the power converter.

3. The power converter of claim 1, wherein
   the oscillation detector is configured to output the oscillation detection signal to a controller of the power converter.

4. The power converter of claim 1, wherein
   the switching regulator is configured to be disabled until the oscillation that occurs in the output voltage disappears in response to the oscillation detection signal.

5. The power converter of claim 1, wherein
   the oscillation detector is configured to determine the oscillation frequency detection range that is higher than an over-current protect operation frequency range and is lower than a switching frequency range of the switching regulator, and
   wherein the switching regulator is further configured to prevent a node, from which the output voltage of the switching regulator is output, from being shorted to a ground based on the over-current protect operation frequency range.

6. The power converter of claim 5, wherein
   the oscillation frequency detection range comprises a part of the over-current protect operation frequency range.

7. The power converter of claim 5, wherein
   the oscillation frequency detection range comprises an operation band when the output voltage of the switching regulator is regulated with the target level, and
   wherein the operation band is a frequency range lower than a half of the switching frequency range.

8. The power converter of claim 1, wherein
   the oscillation detector is configured to amplify the output voltage and generate an oscillation signal based on a first level of an amplified output voltage, a second level of a first reference voltage, and a third level of a second reference voltage, the first reference voltage being higher than the second reference voltage, and wherein the oscillation detector is further configured to detect an oscillation amplitude of the output voltage based on the first and second reference voltages.

9. The power converter of claim 8, wherein
the first and second reference voltages are generated based on an average voltage of the output voltage.

10. The power converter of claim 8, wherein
the oscillation detector is configured to generate a sensing voltage in inverse proportion to a frequency of the oscillation signal and generate a detection signal based on the sensing voltage, a first threshold voltage, and a second threshold voltage, the first threshold voltage being higher than the second threshold voltage, and
the first and second threshold voltages are determined by the oscillation frequency detection range.

11. The power converter of claim 10, wherein
the first threshold voltage is determined by a lower limit frequency in the oscillation frequency detection range and the second threshold voltage is determined by an upper limit frequency in the oscillation frequency detection range.

12. The power converter of claim 10, wherein
the oscillation detector is configured to generate a duty cycle signal based on the oscillation signal and the detection signal, and generate the oscillation detection signal based on a voltage level of the duty cycle signal, a first limit voltage, and a second limit voltage, the first limit voltage being higher than the second limit voltage, and
the first and second limit voltages are determined by the oscillation frequency detection range.

13. The power converter of claim 12, wherein
the oscillation detector is further configured to detect whether the duty cycle signal deviates from the oscillation frequency detection range based on the first limit voltage, and detect whether the duty cycle signal belongs to the oscillation frequency detection range based on the second limit voltage.

14. The power converter of claim 12, wherein
the oscillation detector is further configured to determine whether the oscillation detection signal is not generated by an erroneous operation caused by a noise state by using the oscillation signal before outputting the oscillation detection signal.

15. The power converter of claim 14, wherein
the oscillation detector is configured to output the oscillation detection signal after a time from a start of a counting operation of a counter in accordance with the oscillation signal.

16. An oscillation detector for detecting oscillation of an output voltage, the oscillation detector comprising:
a frequency measuring circuit configured to receive the output voltage as a source voltage, amplify the source voltage, and generate an oscillation signal based on a level of the amplified source voltage and levels of first and second reference voltages;
a frequency detector configured to generate a sensing voltage based on the oscillation signal and a clock signal and generate a detection signal based on the sensing voltage and first and second threshold voltages; and
a duty cycle detector configured to generate a duty cycle signal based on the oscillation signal and the detection signal and generate an oscillation detection signal based on a voltage level of the duty cycle signal, a first level of a first limit voltage, and a second level of a second limit voltage.

17. The oscillation detector of claim 16, wherein the frequency measuring circuit comprises:
a reference voltage generator configured to receive a input reference voltage and generate the first reference voltage and the second reference voltage lower than the first reference voltage based on the input reference voltage;
an amplifier configured to amplify an alternating current (AC) component of the source voltage and output the amplified AC component of the source voltage as an amplified output voltage; and
an oscillation signal generator configured to generate a set signal based on the amplified output voltage with the first reference voltage, generate a reset signal based on the amplified output voltage with the second reference voltage, and output the oscillation signal as a pulse based on the set signal and the reset signal.

18. The oscillation detector of claim 16, wherein the frequency measuring circuit comprises:
a reference voltage generator configured to receive the output voltage as the source voltage, and generate the first reference voltage and the second reference voltage lower than the first reference voltage based on an average voltage of the source voltage;
an amplifier configured to amplify an AC component of the source voltage, and output the amplified AC component of the source voltage as an amplified output voltage; and
an oscillation signal generator configured to generate a set signal based on the amplified output voltage and the first reference voltage, generate a reset signal based on the amplified output voltage and the second reference voltage, and output the oscillation signal as a repeated pulse based on the set signal and the reset signal.

19. A method of detecting oscillation that occurs in an output voltage of a power converter, the method comprising:
receiving the output voltage as a source voltage;
amplifying the source voltage;
generating an oscillation signal based on a level of an amplified output voltage and a first level of a first reference voltage and a second level of a second reference voltage;
generating a sensing voltage based on the oscillation signal and a clock signal;
generating a detection signal based on the sensing voltage, a first threshold voltage, and a second threshold voltage;
generating a duty cycle signal based on the oscillation signal and the detection signal;
generating an oscillation detection signal based on a voltage level of the duty cycle signal, a third level of a first limit voltage, and a fourth level of a second limit voltage; and
outputting the oscillation detection signal to an outside of the power converter.

20. The method of claim 19, further comprising:
outputting the oscillation detection signal after a time in accordance with the oscillation signal to determine whether the oscillation detection signal is not generated by an erroneous operation caused by a noise state by using the oscillation signal before the oscillation detection signal is output.

* * * * *